(12) United States Patent  (10) Patent No.: US 8,824,894 B2
Niibe et al.  (45) Date of Patent: Sep. 2, 2014

(54) PASSIVE OPTICAL NETWORK SYSTEM

(75) Inventors: Masao Niibe, Fujisawa (JP); Masahiko Mizutani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 445 days.

(21) Appl. No.: 13/221,792

(22) Filed: Aug. 30, 2011

(65) Prior Publication Data

US 2012/0063774 A1  Mar. 15, 2012

(30) Foreign Application Priority Data

Sep. 10, 2010 (JP) ................. 2010-203020

(51) Int. Cl.
*H04J 14/08* (2006.01)
*H04Q 11/00* (2006.01)
*H04J 3/16* (2006.01)

(52) U.S. Cl.
CPC .......... *H04J 3/1694* (2013.01); *H04Q 11/0067* (2013.01); *H04J 2203/0066* (2013.01); *H04J 2203/0058* (2013.01); *H04Q 2011/0079* (2013.01)
USPC .............................. 398/98; 398/67

(58) Field of Classification Search
CPC ............................... H04B 10/27; H04J 14/08
USPC ........................ 398/67–73, 98–100
See application file for complete search history.

(56) References Cited

U.S. PATENT DOCUMENTS

| | | | |
|---|---|---|---|
| 2008/0031621 A1* | 2/2008 | Kuo et al. | 398/26 |
| 2009/0067850 A1 | 3/2009 | Mizutani et al. | |
| 2009/0202242 A1 | 8/2009 | Niibe et al. | |
| 2010/0034534 A1 | 2/2010 | Niibe et al. | |
| 2010/0067913 A1 | 3/2010 | Niibe et al. | |
| 2010/0316379 A1* | 12/2010 | Suvakovic | 398/58 |

FOREIGN PATENT DOCUMENTS

| | | | | |
|---|---|---|---|---|
| JP | 10-126348 A | 5/1998 | | |
| JP | 2009188901 A | 8/2009 | | |
| JP | 201041610 A | 2/2010 | | |
| JP | 201074214 A1 | 4/2010 | | |
| WO | WO 2010028668 A1 * | 3/2010 | | H04L 5/00 |

OTHER PUBLICATIONS

ITU-T, G.984.3 Series G. Transmission Systems and Media, Digital Systems and Networks, "Gigabit-capable Passive Optical Networks (G-PON): Transmission convergence layer specification" Mar. 2008, pp. i-135.

* cited by examiner

*Primary Examiner* — Leslie Pascal
(74) *Attorney, Agent, or Firm* — Volpe and Koenig, P.C.

(57) ABSTRACT

When an ONU accommodating range is enlarged, and ONUs shorter and ONUs longer in a communication path to an OLT are accommodated in a PON at the same time, there is a need to change a light intensity at the time of transmitting a downstream signal in order that both of the ONUs receive a downstream signal from the OLT. When a near-end ONU receives a signal having a light intensity necessary to communicate between the OLT and a far-end ONU, there arises such a problem that the light intensity is as high as an ONU receiver fails. In order to eliminate the ONU failure of the above problem, prior to transmission of the downstream signal, a downstream signal transmission schedule (downstream light intensity map) is notified to all of the ONUs. An optical transceiver of the OLT has a function of adjusting an output light intensity, and adjusts the light intensity to values receivable by the individual ONUs when the signal arrives at the respective ONUs according to route distances to the respective ONUs.

13 Claims, 23 Drawing Sheets

| ITEM NO. | ONU-ID | Start | End | LIGHT INTENSITY | COMMUNICATION BIT RATE |
|---|---|---|---|---|---|
| No.1 | 1 | 100 | 200 | LA10000 | 2.5Gbps |
| No.2 | 2 | 201 | 300 | LA10000 | 2.5Gbps |
| ... | ... | ... | ... | ... | ... |
| No.w-1 | v-1 | 400 | 450 | LA10000 | 2.5Gbps |
| No.w | v | 451 | 500 | LA10000 | 10Gbps |
| ... | ... | ... | ... | ... | ... |
| No.w-1 | w-1 | 600 | 670 | LA10010 | 2.5Gbps |
| No.w | w | 671 | 700 | LA10010 | 2.5Gbps |
| ... | ... | ... | ... | ... | ... |
| No.x-1 | x-1 | 800 | 860 | LA10010 | 2.5Gbps |
| No.x | x | 861 | 900 | LA10010 | 10Gbps |
| ... | ... | ... | ... | ... | ... |
| No.y-1 | y-1 | 1050 | 1100 | LA10020 | 2.5Gbps |
| No.y | y | 1101 | 1200 | LA10020 | 2.5Gbps |
| ... | ... | ... | ... | ... | ... |
| No.z-1 | z-1 | 1300 | 1400 | LA10020 | 2.5Gbps |
| No.z | z | 1401 | 1500 | LA10020 | 10Gbps |
| ... | ... | ... | ... | ... | ... |

| Port-ID | LIGHT INTENSITY/ AMPLIFICATION FACTOR | Valid | ONU GROUP | OTHER FLAG |
|---|---|---|---|---|
| | 10912 | 10913 | 10914 | 10915 |
| Port 1 | x dB | 1 | A | |
| Port 5 | y dB | 1 | C | |
| ... | | | | |

| Port-ID | LIGHT INTENSITY/ AMPLIFICATION FACTOR | Valid | ONU GROUP | OTHER FLAG |
|---|---|---|---|---|
| | 10916 | 10913 | 10914 | 10915 |
| Port 1 | 1.0 | 1 | A | |
| Port 5 | 5.0 | 1 | C | |
| ... | | | | |

(10911)

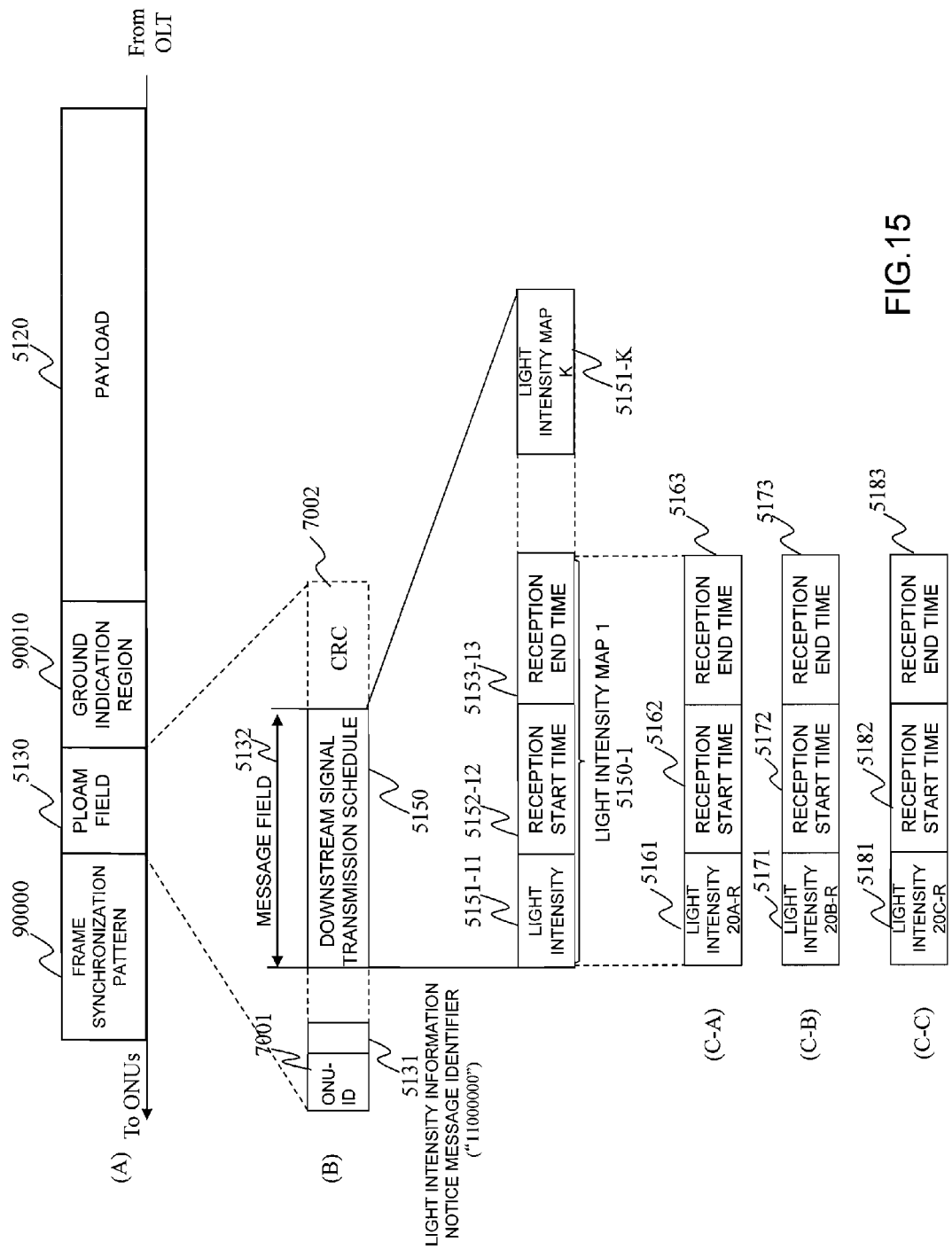

PASSIVE OPTICAL NETWORK SYSTEM

CLAIM OF PRIORITY

The present application claims priority from Japanese patent application JP 2010-203020 filed on Sep. 10, 2010, the content of which is hereby incorporated by reference into this application.

BACKGROUND OF THE INVENTION

1. Technical Field

The present invention relates to a configuration and an operating method of an optical communication system in which plural subscriber devices share an optical transmission line, and a system extension such as an extension of a transmission distance or an increase in the number of subscribers in the system.

2. Related Art

A demand for communication using broadband has been increased, and an access line for users has increasingly undergone transition from an access technology based on a telephone line such as digital subscriber lines (DSL) to a large-capacity access line using optical fibers. At present, in the access line service, passive optical network (PON) systems have been frequently used from the viewpoints of the line laying costs and maintenance costs. For example, the standardization technology in the International Telecommunication Union Telecommunication Standardization Sector (ITU-T) is recited as a typical example (ITU-T Recommendation G.984.3). Since about 2006, introduction of a gigabit PON (GPON) into the access network has been started in the respective countries.

In the PON, an optical signal is split or multiplexed by the aid of an optical fiber and an optical splitter, and transmitted and received between an optical line terminal (hereinafter referred to as "OLT") and an optical network unit (hereinafter referred to as "ONU"). A communicatable distance between the OLT and the ONU has a given limit distance due to attenuation of the optical signal that passes through the optical fiber and a light intensity attenuation caused by optical split through the optical splitter. As a specific example, in the case of the GPON, generally, a communication interval is set to 20 km at a maximum, and the number of splits (the number of ONUs connectable to the OLT) is set to 64.

With an increase in chances where standard home users access to an internet through an access circuit to collect information, and chances where the users use public service through a communication line, an enlargement of an access network provision area (service scale) is demanded for each carrier. That is, while an increase in the number of access line users is facilitated, measures (business investment) for increasing the number of users for each subscriber station are required to accommodate new users. As a method of increasing the number of users for each station, there are proposed a method in which a user accommodating device (PON) is added (that is, an OLT is added), or a method in which the number of users for each PON system, that is, the number of ONUs is expanded.

The PON is configured so that all of complicated system control for preventing the optical signals from being mixed together, and ONU management are implemented by the OLT. For that reason, in general, the OLT is far more expensive than the ONU. Further, the costs for newly laying the optical fiber result in huge carrier expense. In view of the above circumstances, a desirable solution is to increase the number of ONUs for each OLT.

On the other hand, for enlargement of the transmission capacity in the access network, transmission at a higher bit rate than that in the related art has been studied. In the ITU-T and the IEEE (Institute of Electrical and Electronics Engineers), the standardization of the respective next-generation PONs which are called "10 gigabit PON" (10GPON) and "10 gigabit Ethernet (registered trademark) PON" (10GEPON) has been advanced. In the high bit rate transmission of this type, the attenuation of the optical signal that passes through the optical fiber and the wavelength dispersion become larger than those in the transmission at the related-art bit rate. Accordingly, in order to construct a system having the same communication distance as that of the existing PON, the system needs to have a light receiving device having a wide dynamic range, a high performance (low attenuation and low dispersion) optical fiber, and a dispersion compensating function, resulting in a remarkable increase in the costs. The number of users can be increased due to the higher bit rate whereas an increase in the development costs is problematic.

JP-A-2009-065443 discloses a communication system that synchronizes a time of a terminal device with a time of a transmission device, and a device thereof.

SUMMARY OF THE INVENTION

In order to increase the number of users accommodated in the PON, a method of enlarging an ONU distribution (distribution of a distance between OLT and ONUs; hereinafter referred to as "difference distance of ONUs") connected to the OLT installed in a station is effective. When the ONU difference distance is increased, if a downstream signal transmitted from the OLT to the ONUs is received by the ONUs, there arises such a problem that a received light intensity or an S/N ratio is largely different between the closest ONU and the farthest ONU when viewed from the OLT, which may exceed an allowable range of a light receiving device sensitivity. This is caused because difference in the optical fiber distances to the individual ONUs by which the optical signal passes is larger than that in the related art. The number of splitters through which the optical signal passes from the OLT to the ONUs is different depending on the PON configuration (in general, the number of passed splitters is more increased as the ONUs are farther from the OLT), and an light intensity difference of the downstream signals received by the respective ONUs is further increased.

In general, from the viewpoint of the PON introduction costs, all of the ONUs are required to provide the same performance. In order to satisfy this condition, for the purpose of absorbing the light intensity difference caused by increasing the distance difference between the OLT and the ONUs, a larger dynamic range than that in the related art is required for receivers of the OLT and the ONUs. However, it is difficult to improve the performance of the light receiving device without increasing the price. Accordingly, a signal that can be received by the ONU situated closely to the OLT cannot be identified by the ONU remotely situated. Conversely, when the optical signal transmitted to the ONU remotely situated is received by the ONU closely situated, there is a possibility that the receiving device of the ONU closely situated fails.

Moreover, in the near future, there is a demand to additionally introduce the high bit rate transmission technology that targets 10 Gbit/s as the next-generation PON as described in this technology. In the introduction of 10 Gbit/s compliant PON, coexistence with the PON of the existing Giga bit rate class is required. That is, even if the distance between the OLT and the ONUs is identical with that in the existing PON, a difference in the transmission characteristic of the optical fiber caused by the difference in the bit rate leads to an unignorable difference in the light intensity received by the ONU side. Also, due to the feature of the PON that a communication bandwidth is shared by the entire ONUs with an increase in the number of ONUs, there is disadvantageous in that the bandwidths assigned to the individual ONUs are decreased. Accordingly, there is required a device for maximizing the assigned bandwidth per ONU.

An object of the present invention is to provide a downstream signal transmitting method in which even if an optical amplifier is introduced into the PON to extend a communication distance between the OLT and the ONUs or to increase the number of ONUs, in the ONUS the respective performances of which are equal to each other, a failure of optical receivers attributable to an excessive received light intensity, or a reception failure caused by the deterioration of the optical signal are prevented from occurring, and the downstream signal from the OLT is received by all of the ONUs to maximize a communication traffic per ONU. Another object of the present invention is to provide a PON system and a downstream signal control method in the PON, which can suppress the above problems without largely changing the functions provided in the related-art PON.

Prior to the transmission of a downstream signal from the optical line terminal (OLT) to the optical network units (ONUs), the OLT notifies the ONUs of a signal transmission schedule including light intensity information on the downstream signal. Each of the ONUs determines timing (hereinafter also referred to as "reception time slot") at which the subject ONU has to receive the downstream signal on the basis of previous notice information, and allows an optical receiver of the subject ONU to block the optical signals transmitted at other time slots. With this configuration, a communication failure warning caused by a failure of the optical receiver at a near-end ONU or a failure of optical signal reception at a far-end ONU is prevented from being issued. The signal transmission schedule is periodically transmitted from the OLT to the respective ONUs. Further, in transmission of the signal transmission schedule, the signal can be transmitted independently of a main signal frame, or transmitted so as to be included in an identical frame, according to a relationship between a signal transmission period and a downstream signal transmission time.

The downstream signal transmission schedule includes light intensity control information at the time of transmitting the downstream signal. In order that the signal transmission schedule notified prior to transmission of the main signal is accurately received by the optical network unit side (the receiver is prevented from being destroyed by control information), in advance, the previous notice of the information on the light intensity control is given to the individual optical network units of a timing at which the control information is to be received.

The above problem can be solved by a communication system comprising:
a plurality of optical network units, and
an optical line terminal connected to the optical network units through optical fibers, wherein
the optical line terminal measures communication distances to the optical network units, holds measurement results, adjusts a light intensity of a downstream communication signal to each of the optical network units on the basis of the measurement results, and notifies the optical network units of a transmission schedule of the downstream communication signal prior to transmission of the downstream communication signal, and each of the optical network units receives only an optical signal of the subject optical network unit on the basis of the received transmission schedule, and discards or blocks optical signals addressed to other optical network units.

Also, it can be solved by a communication device connected to optical network units through optical fibers, comprising: a function of measuring communication distances to the optical network units and holding measurement results; and a function of adjusting a light intensity of a downstream communication signal to the optical network units on the basis of the measurement results, and notifying the optical network units of a transmission schedule of the downstream communication signal in a given period prior to transmission of the downstream communication signal.

Furthermore, it can be solved by an optical network unit connected to an optical line terminal through an optical fiber, comprising:

a reception timing determination unit that acquires, upon receiving an optical signal transmitted from the optical line terminal, from the received signal, timing information on which an optical signal addressed to the subject optical network unit, or an optical signal having a light intensity that can be received by the subject optical network unit arrives at the subject optical network unit, with reference to the received signal;

a block mechanism that blocks the optical signal when the optical signal transmitted from the optical line terminal exceeds a light intensity receivable by the optical network unit;

a discard function that discards the optical signal when the optical signal transmitted from the optical line terminal falls below a light intensity receivable by the optical network unit; and a function of acquiring the optical signal of the light intensity that can be received by the subject optical network unit, or an arrival timing of the optical signal addressed to the subject optical network unit in a given period, prior to reception of the optical signal.

According to the present invention, the communication distance between the OLT and the ONUs can be extended.

BRIEF DESCRIPTION OF THE DRAWINGS

FIG. 12 is a table of downstream light intensity information;

FIG. 14A is a diagram illustrating a configuration of one optical amplification factor database held in the light controller of the OLT;

FIG. 14B is a diagram illustrating a configuration of another optical amplification factor database held in the light controller of the OLT;

FIGS. 15A to 15C-C are diagrams illustrating a frame format of a downstream signal;

DETAILED DESCRIPTION OF THE PREFERRED EMBODIMENTS

Figure 1:
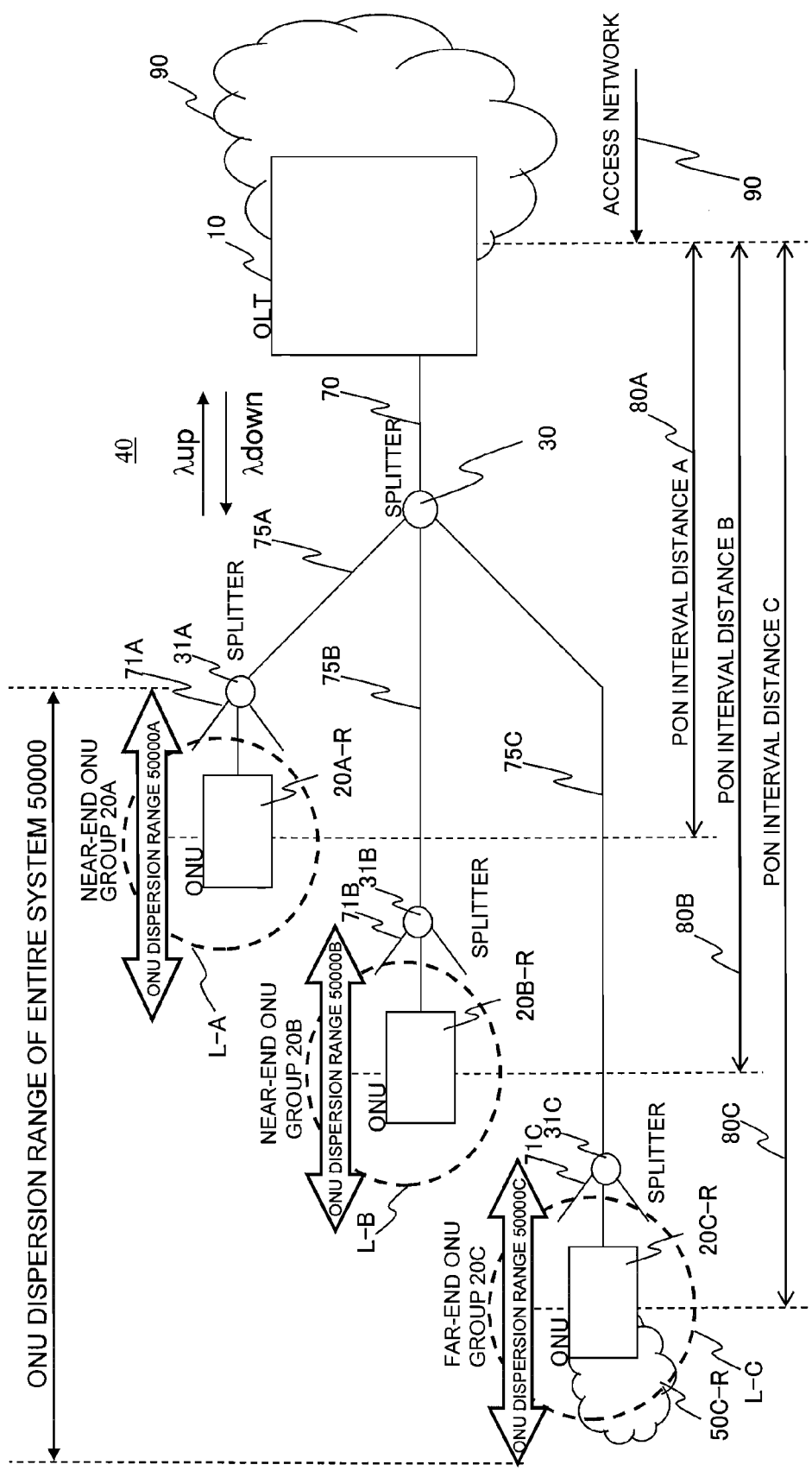
FIG. 1 is a block diagram of a passive optical network system.

Hereinafter, a description will be given of embodiments of the present invention in detail with reference to the accompanying drawings. Substantially the same parts are denoted by identical reference numerals, and their repetitive description will be omitted. Also, the configuration and operation of a PON according to the embodiments will be described as the configuration and operation of the GPON specified in ITU-T Recommendation G.984.3. However, the PON of the embodiments is not limited to the GPON.

Referring to FIG. 1, a PON system according to this embodiment will be described. Referring to FIG. 1, a PON system 40 includes an OLT 10, an ONU group 20A, an ONU group 20B, and an ONU group 20C. A concentrated optical fiber 70 connects the OLT 10 to a splitter 30. A first branch optical fiber 75 connects the splitter 30 to a branch splitter 31. A second branch optical fiber 71 connects the branch splitter 31 to an ONU 20.

The ONU group 20A is an ONU group at a nearest end with respect to the OLT 10. On the other hand, the ONU group 20C is an ONU group at a farthest end thereto. Also, the ONU group 20B is an ONU group between the ONU group 20A and the ONU group 20C. In particular, a difference distance (a communication distance difference to the OLT) between the nearest-end ONU in the ONU group 20A and the farthest-end ONU in the ONU group 20C exceeds 20 km that is a standard in the GPON. It is assumed that inter-ONU distance differences 50000-A, 50000-B, and 50000-C within the individual ONU groups each fall within 20 km. It is assumed that a distance difference (a maximum communication distance difference between the ONU 20 and the OLT 10) when all of the ONUs 20 are dispersed is an ONU distribution range 50000.

In the GPON, if the difference distance between the ONUs falls within 20 km, a received light sensitivity range of the optical module which is commonly available for all of the ONUs is prescribed in a range enabling an optical communication with the OLT 10 (60 km at a maximum in the prescription). Once the optical fibers configuring the PON have been laid, there is a low possibility that a replacement or a configuration change of the optical fiber is conducted without occurrence of a considerable accident. Also, once the ONU is installed, the setting status of the PON is not changed in the ONU installation location without occurrence of circumstances such as move or urban renewal. Accordingly, the GPON is a stable system in which changing the communication quality is extremely rare.

In this embodiment, the existing device and the optical device are recycled as much as possible. A significant feature of the first embodiment resides in a configuration where the ONUs 20 configuring the PON system 40 are divided into groups so that the distance difference from the OLT 10 falls within 20 km, and then connected and managed. More specifically, branch splitters 31A, 31B, and 31C that bundle the respective groups of the ONUs 20 are disposed at a second stage under the splitter 30, and the ONUs are connected to the respective branch splitters 31A to 31C. It is assumed that the respective communication distances of the PON interval from the OLT 10 to the centers of the ONUs 20A, 20B, and 20C are distances A, B, and C. It is assumed that the PON intervals are PON intervals 80A, 80B, and 80C. It is assumed that the ONU distribution ranges within the respective ONU groups are 50000A, 50000B, and 50000C.

Each ONU 20 (20A-1 to 20C-nC) is connected to a terminal such as a subscriber network 50, a PC, or a telephone. In FIG. 1, a subscriber network 50C-R connected to the ONU 20C-R is typically represented in FIG. 1. Further, the OLT 10 is connected to an access network 90 that is a higher-level communication network. When an optical signal amplifier (an intensity controller within the OLT 10) 11000 within the OLT 10 is replaced with optical amplifiers for the PON intervals 80A to 80C, the optical amplifier is introduced for each optical fiber (optical fibers 75B and 75C in FIG. 1) of the respective branch networks, and a carrier adjusts the optical amplifier so that a signal of an appropriate light intensity arrives at the signal transmission destination ONU (ONU groups 20B and 20C in FIG. 1). With this configuration, each ONU 20 can receive the signal no matter what the distance from the OLT is. However, there arises such a problem that the costs for installation and maintenance of the optical amplifier are increased. Hence, in the introduction of the optical amplifier on the practical use, a method of introducing the optical amplifier into an optical fiber (optical fiber 70 in FIG. 1) of a backbone network, or mounting the optical amplifier within the OLT 10 minimizes the costs. Any configurations do not essentially affect the present invention, and the following embodiments will be described with a configuration having the optical signal amplifier 11000 within the OLT. The same advantages are obtained even if an optical module that can transmit a sufficiently intense optical signal is loaded on the OLT instead of the introduction of the optical signal amplifier.

The OLT 10 further transmits and receives information with respect to a higher-level communication network through the access network 90. The OLT 10 transfers information addressed to a user under the OLT 10 to each ONU 20. The access network 90 is frequently configured by a packet communication network having an IP router and an Ethernet (registered trademark) switch. However, the access network 90 may be configured by a communication network using another communication protocol. It is general that each ONU 20 is installed in a user home or a corporate site, and connected to the subscriber network 50 such a LAN or an appropriate network. Each subscriber network 50 is connected to an information terminal such as a telephone terminal or a PC/mobile terminal which provides services of an IP phone or existing phone. In the PON interval 80 (80A to 80C), wavelengths of the optical signals to be used are different between an upstream signal λup and a downstream signal λdown, and the signals do not interfere with each other in the optical fibers 70, 75 (75A to 75C), 71 (71A to 71C), and the splitters 30, 31 (31A to 31C).

A downstream signal transmitted from the OLT 10 toward the ONUs 20 are amplified or adjusted in intensity by an intensity controller 11000 made up of an optical signal amplifier, and thereafter split by the splitter 30 and the branch splitters 31A to 31C. The downstream signal then arrives at the ONUs 20A-1 to 20C-nC which configure an optical access network 40. In the GPON, the downstream signal from the OLT 10 is sent with the use of a frame (hereinafter referred to as "downstream basic frame") for use in communication in the PON interval 80 (80A to 80C). The downstream basic frame accommodates a frame conforming to a format which is called "GPON encapsulation method (GEM) frame" therein. The GEM frame is configured by a header and a payload, and each header has an identifier (hereinafter also referred to as "Port-ID") for identifying the ONU 20 that is a destination of the individual GEM frames inserted thereinto. Each ONU 20 refers to a destination Port-ID included in a header of the GEM frame. If a frame is addressed to the subject ONU 20, the ONU 20 processes such a frame. If a frame is addressed to another ONU 20, the ONU 20 discards such a frame.

Subsequently, the system operation for conducting an upstream communication will be described. First, in starting up the PON system 40, the OLT 10 measures the individual round trip delays (RTD) to the ONUs 20 in a ranging process when starting up the individual ONUs. The OLT 10 determines a value of an equalization delay (EqD) on the basis of the measurement result. The EqD is stored in ranging/DBA information 1061 of the OLT 10. The ranging may be conducted by using a ranging method stipulated in ITU-T Recommendation G.984.3. The EqD is set so that response times from the individual ONUs 20 to the OLT 10 become identical with each other within the system, like the EqD of the existing PON.

The ranging/DBA information 1061 of the OLT 10 holds the EqD information and the RTD in the PON interval 80. This is because after the OLT 10 assigns the bandwidths to the respective ONUs 20, the upstream signal is correctly received from the appropriate ONU 20.

In the upstream communication from the respective ONUS toward the OLT 10, all of the ONUs 20 have the optical signal of the same wavelength λup. The upstream signal has a GEM frame like the downstream signal. The respective ONUs 20 transmit the upstream signals while shifting transmission timing so that the OLT 10 can identify the GEM frames from the respective ONUs 20, and the individual upstream signals do not collide and interfere with each other on the concentrated optical fiber 70. Those signals are subjected to time division multiplexing on the second branch optical fibers 71 (71A to 71C), the first branch optical fibers 75 (75A to 75C), and the concentrated optical fiber 70. Then, those signals arrive at the OLT 10.

Specifically, (1) the distances from the OLT 10 to the respective ONUs 20A-1 to 20C-n are measured in the ranging process to adjust the delay amount of the signal. (2) According to an instruction from the OLT 10, the respective ONUs 20A-1 to 20C-nC are made to declare the data amount waiting for transmission. (3) With a dynamic bandwidth assignment (DBA) function (a function for dynamically assigning the communication bandwidth (time slot) for the upstream signal to the ONUs 20), the upstream signal transmission timing and the transmittable upstream communication data amount of the respective ONUs 20-1 to 20-n are instructed on the basis of the declaration. (4) The respective ONUs 20 transmit the upstream communication data at the timing instructed from the OLT 10. As a result, those signals are subjected to the time division multiplexing on the second branch optical fiber 71, the first branch optical fiber 75, and the concentrated optical fiber 70, and arrive at the OLT 10. (5) Since the OLT 10 knows the timing instructed to the respective ONUs 20, the OLT 10 identifies the signals of the respective ONUs 20 from the multiplexed signal, and implements the processing of a received frame.

Figure 2:
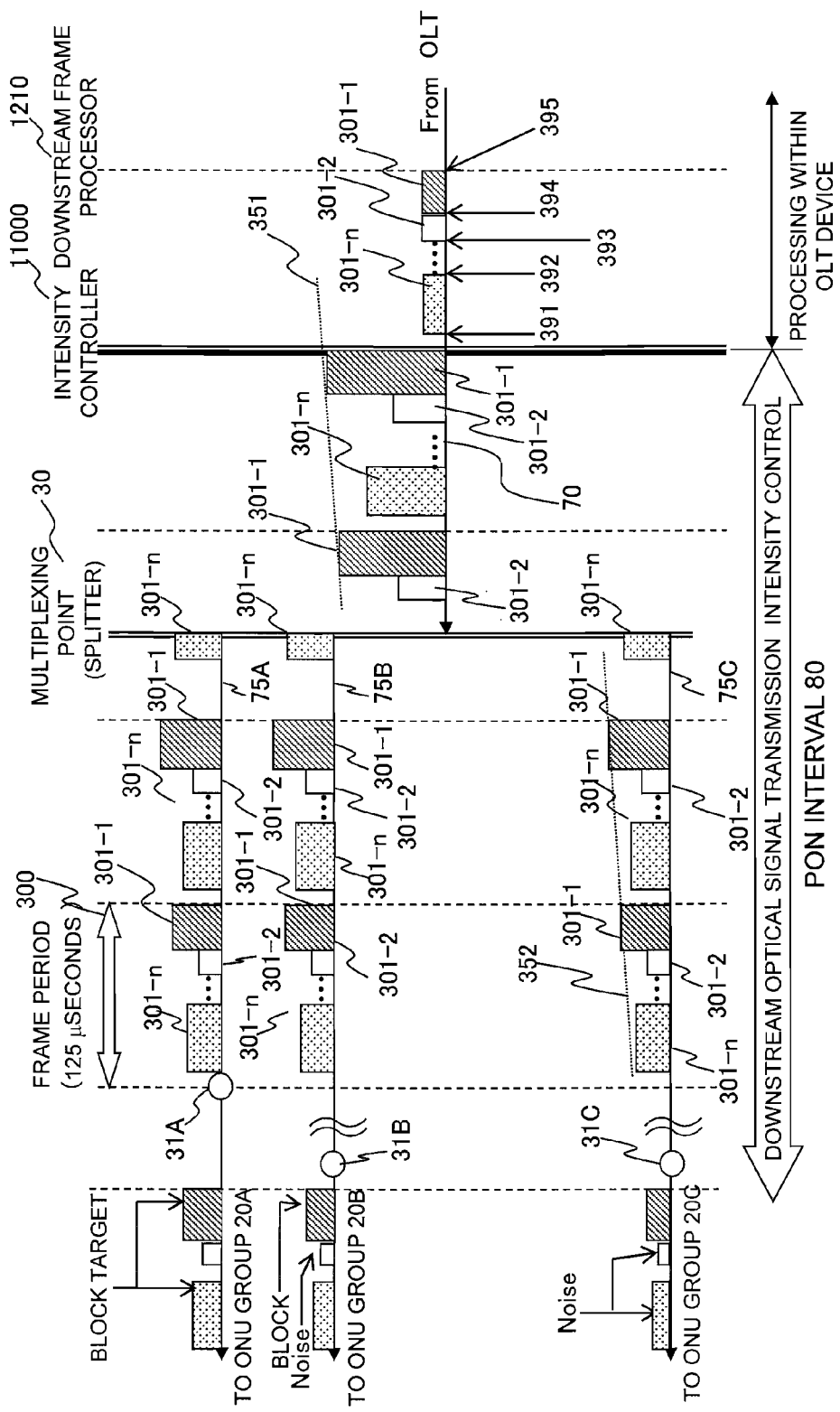
FIG. 2 is a diagram illustrating a downstream signal time division multiplexing transmission.

Referring to FIG. 2, the time division multiplexing transmission of the downstream signal will be described. Referring to FIG. 2, when the OLT 10 receives the signal from the access network 90 through a service network interface (SNI), the OLT 10 capsules the received signal in a GEM frame through a downstream frame processor 1210. The OLT 10 further combines one or plural GEM frames together to generate a downstream communication basic frame (hereinafter referred to as "downstream basic frame" or "basic frame") with 125 microseconds as a unit. Thereafter, the OLT 10 converts the generated downstream frame into an optical signal through an O/E processor 1310. The OLT 10 also converts the optical signal into the light intensity specified in a light controller 1090 for the ONUs 20 that are destinations of the respective GEM frames, and transmits the light intensity to the concentrated optical fiber 70.

FIG. 2 illustrates a case in which the downstream signal is transmitted and multiplexed from the OLT 10 to the ONUs 20, and a period indicated by dotted lines indicates a frame period (125 microseconds). Further, auxiliary lines 351 and 352 indicate a case in which the intensity of the optical signals is gradually deteriorated while the optical signals are passing though the optical fiber (and deterioration of an S/N ratio, and the deterioration of a signal identification level due to a wavelength dispersion effect).

The optical signal transmitted to one concentrated optical fiber 70 is split into the respective branch optical fibers 75A to 75C through the splitter 30, and further split by the splitters 31A to 31C, and distributed into the branch optical fibers 71A to 71C. The light intensity is reduced when passing through the splitters 30 and 31. However, the OLT 10 transmits the optical signal with intensity necessary for arriving at the subject ONU 20, taking the reduction of the light intensity into account. The respective ONUs 20 receive the downstream signals through the branch optical fibers 71A to 71C. In FIG. 2, the optical signals 301-1 to 301-n indicate the transmission positions and transmission data sizes of the downstream frames transmitted to the respective ONUs 20A-1 to 20C-nC. In a correspondence relationship with FIG. 1, it is conceivable that the downstream signal 301-1 is for the ONU 20A-R, the downstream signal 301-2 is for the ONU 20B-R, and the downstream signal 301-n is for the ONU 20C-R.

Also, FIG. 2 illustrates there is a difference in the intensity of the optical signal transmitted to the ONU 20 by the OLT 10. In FIG. 2, the light intensity of the received signal addressed to the ONU group 20C is the highest, and the light intensity is higher in the order of the ONU group 20B and the ONU group 20A. The information is transmitted while a relationship of the intensity of the optical signal is also maintained on the concentrated optical fiber 70 after passing through the splitter 30. The processing from the downstream frame processor 1210 to the intensity controller 11000 is conducted within the OLT 10. The intensity and the layout time of the optical signal in the PON interval 80 represent a state (time (hereinafter also referred to as "timing") and intensity) of the optical signal in the respective intervals.

Subsequently, the operation when the downstream light signal arrived will be described. The ONU group 20A receives an optical signal 301-2. The ONU group 20A is closest to the OLT 10, and other signals are higher in the light intensity than the signal addressed to the ONU group 20A. Under the circumstances, those signals (signals 301-1, 301-*n* in FIG. 2) are blocked in an intensity controller 2311 of the ONU 20 (hereinafter "interrupt" or "attenuate" is called "block" as a whole).

The downstream signal processing in the ONU group 20B is conducted as follows. The light intensity of the optical signal 301-2 addressed to the ONU group 20A has been already reduced to a noise level or lower, and therefore is not regarded as a significant signal. However, the optical signal 301-1 addressed to the ONU group 20C still keeps a sufficient intensity, and the ONU group 20B blocks the optical signal 301-1 for the purpose of protecting the optical receivers of the ONUs 20B-1 to 20B-*nB* from failure. The ONU group 20B also grasps the downstream signal delivery information addressed to the ONU group 20A. Therefore, even if the signal is not significant, the ONU group 20B refers to a light intensity map that will be described later, and issues no loss of signal (LOS) warning if the signal of interval is addressed to the ONU group 20A.

In the ONU group 20C, signals other than the signal addressed to the ONU group 20C are almost buried in the noise level. Accordingly, there is no signal to be particularly blocked. However, the ONU group 20C determines whether the LOS warning is necessary, or not, from the viewpoints of delivery states of the downstream signal addressed to the other groups, like the ONU group 20B. A device in which the signal of the light intensity other than that addressed to the own ONU group is blocked by each ONU, or determined as no signal to be received will be described with reference to another drawing.

Figure 3:
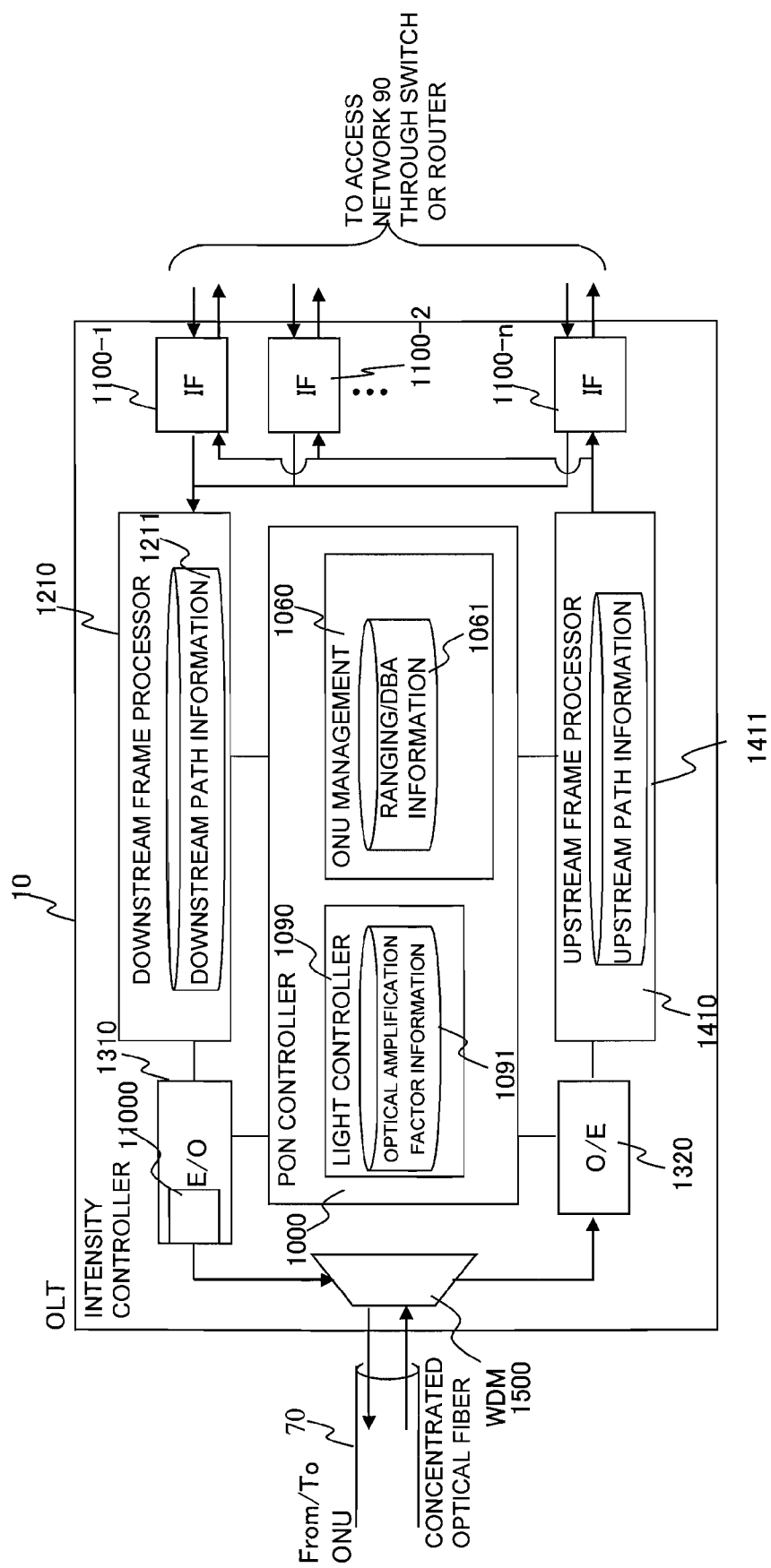
FIG. 3 is a block diagram illustrating a configuration of an OLT.

Referring to FIG. 3, the configuration of the OLT 10 will be described. In FIG. 3, the OLT 10 includes plural IFs 1100, the downstream frame processor 1210, the E/O 1310, a WDM 1500, an O/E 1320, an upstream frame processor 1410, and a PON controller 1000. The downstream frame processor 1210 includes downstream path information 1211. The O/E processor 1310 includes the intensity controller 11000. The upstream frame processor 1410 includes upstream path information 1411. The PON controller 1000 includes the light controller 1090 and an ONU management unit 1060. The light controller 1090 includes optical amplification factor information 1091. The ONU management unit 1060 includes the ranging/DBA information 1061.

The downstream signal is input to IF1100-1 to 1100-*n* which are called "service network interfaces (SNIs)" from the access network 90. The access network 90 is frequently configured by a packet communication network. The IFs 1100 are each configured frequently by an Ethernet interface of 10/100 Mbit/s or 1 Gbit/s. However, there is no need to limit the embodiment to this configuration. A received signal (hereinafter an electric signal or optical signal transmitted or received on a communication network may be called "data", "frame", or "packet". Those signals are configured by a header part and a payload part) is transferred to the downstream frame processor 1210. The downstream frame processor 1210 analyzes header information of the packet. More specifically, the downstream frame processor 1210 determines the ONU 20 to which a received packet is to be transferred, on the basis of flow identification information including destination information, source information, and path information included in the header of the packet. The downstream frame processor 1210 converts or allocates the header information of the received packet as required. The downstream frame processor 1210 includes the downstream path information DB 1211 for determining processing including determination of the destination, and the conversion and allocation of the header information. The downstream frame processor 1210 processes the above-described processing with reference to the DB 1211 with use of one or plural parameters included as the header information of the received packet as a key.

The downstream frame processor 1210 further includes a frame generating function for changing the received packet to a frame format for transmission in the PON interval 80 according header processing contents determined within the downstream frame processor 1210.

More specifically, specific processing when the received packet of the Ethernet is transmitted to the PON interval 80 of the GPON will be described below. (1) The header information of the Ethernet packet is extracted. (2) The downstream path information DB 1211 is searched with use of the header information as a key to determine VLAN tag processing (conversion, deletion, transmission, allocation) on the received packet, and a transfer destination. (3) Further, a GEM header including Port-ID set in the subject transfer destination ONU by a frame generating function is generated. (4) A GEM header is allocated to the received packet to capsule the Ethernet packet as the GEM frame.

The GEM frame that capsules the Ethernet packet is read from the downstream frame processor 1210. The O/E processor 1310 converts an electric signal into an optical signal. The O/E processor 1310 transmits the optical signal to the ONU 20 through the wavelength division multiplexer (WDM) 1500 and the concentrated optical fiber 70. In this situation, the intensity controller 11000 equipped in the O/E processor 1310 provides a different light intensity according to the ONU group to which the ONU 20 that is a target of the frame belongs. The intensity controller 11000 is realized by an optical amplifier and an amplification factor setting circuit (not shown) of the optical amplifier. The amplification factor setting circuit is controlled according to an instruction from the light controller 1090. The light controller 1090 refers to a destination of the downstream frame, and sets the amplification factor of the frame according to the amplification factor obtained from the optical amplification factor information 1091 associated with the destination. More specifically, the optical amplification factor information can be set on the basis of ranging information (communication distance information in the PON interval calculated on the basis of the RTD) held in the ONU management unit 1060.

The PON controller 1000 provided in the OLT 10 controls the setting and management of the respective ONUs 20, and controls the entire PON 40 including a signal transmission control of the upstream and downstream two ways. In this embodiment, the OLT 10 implements the intensity control of the downstream optical signal. In order to implement the light intensity control of the downstream signal, the light controller 1090 is included in the OLT 10 as one function of the PON controller 1000. The information held in the ranging/DBA information 1061 of the PON controller includes an EqD setting value of each ONU 20. The EqD setting value is information corresponding to a transmission distance (delay time) from the OLT 10 to each ONU 20. The EqD setting value is used for DBA processing during operation of the PON. Further, the ranging/DBA information 1061 is a database that can be used in determination of the light intensity when transmitting the downstream signal. The PON controller 1000 calculates the transmitting light intensity, the data amount (bandwidth), and the transmission timing (position information or time/timing on the frame) of the downstream signal transmitted to each ONU 20, and stores the calculated information in the ranging/DBA information 1061.

Figure 4:
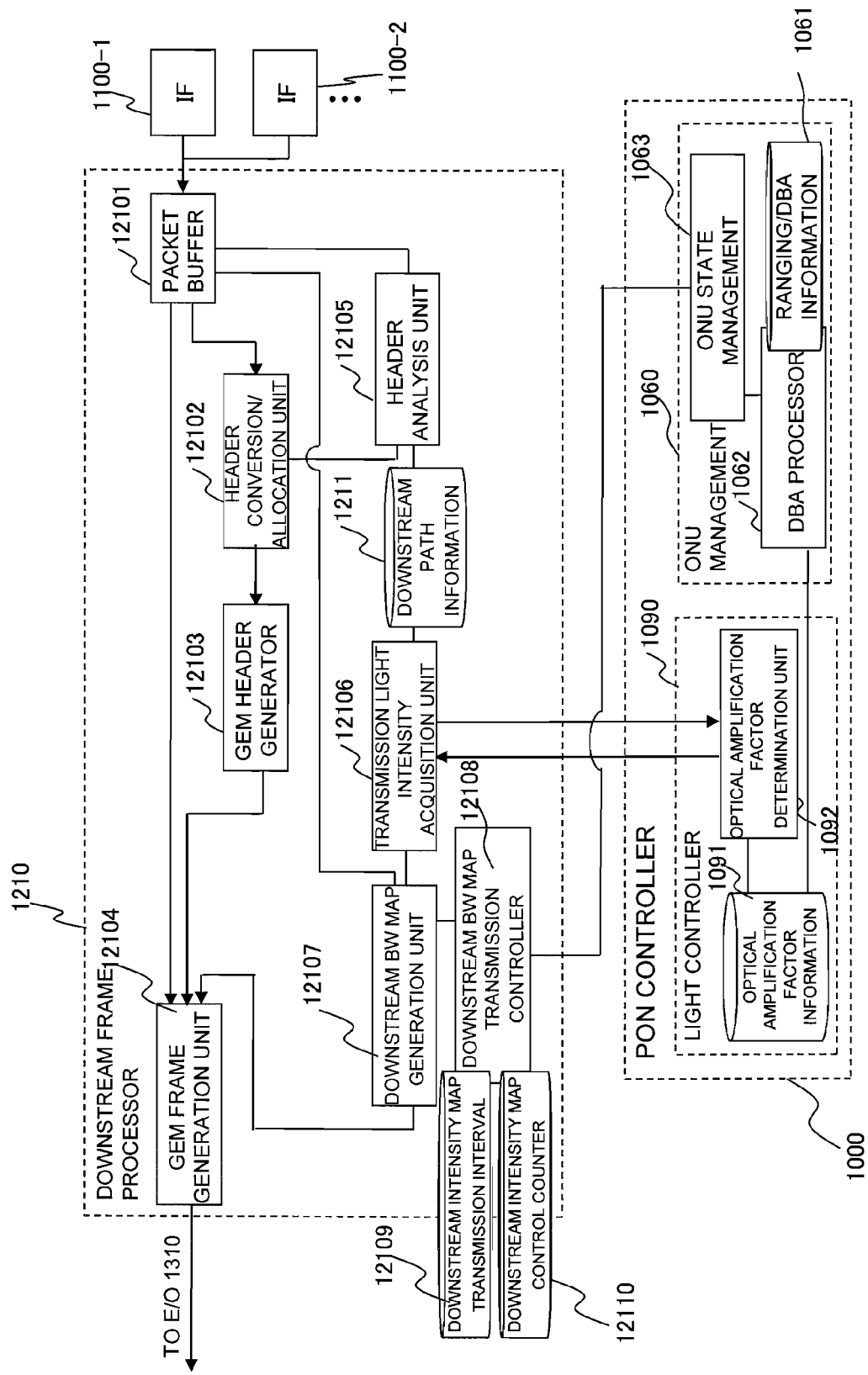
FIG. 4 is a block diagram illustrating the details of a downstream frame processor and a PON controller in the OLT.

Referring to FIG. 4, the downstream frame processor 1210 and the PON controller 1000 of the OLT 10 will be described in detail below. Referring to FIG. 4, the downstream frame processor 1210 includes a packet buffer 12101, a header conversion/allocation unit 12102, a GEM header generator 12103, a GEM frame generation unit 12104, a header analysis unit 12105, the downstream path information DB 1211, a transmitting light intensity acquisition unit 12106, a downstream bandwidth (BW) map generation unit 12107, and a downstream light intensity map (BW) transmission controller 12108. Also, the light intensity map controller 12108 includes a light intensity map transmission interval DB 12109, and a light intensity map control counter 12110.

The PON controller 1000 includes a DBA processor 1062 and the ranging/DBA information 1061 in the ONU management unit 1060. Further, the PON controller 1000 includes an optical amplification factor determination unit 1092, and the optical amplification factor information 1091 referred to from the optical amplification factor determination unit 1092.

The downstream packet processing transferred to the downstream frame processor 1210 is conducted by the following procedure. The downstream packets received by the IFs 1100-1 and 1100-2 are once stored in the packet buffer 12101, and thereafter transferred to the O/E processor 1310 through the GEM frame generation unit 12104. Through a series of flows for notifying the GEM frame generation unit 12104 of the packet information, the downstream frame processor 1210 conducts (1) analysis of the header information and determination of a transfer route (that is, destination ONU). Also, the downstream frame processor 1210 conducts (2) determination of the downstream packet transmitting light intensity and generation of the downstream light intensity map (also called "downstream BW map").

In the processing (1), the header analysis unit 12105 acquires the header part of the received packet from the packet buffer 12101. The header analysis unit 12105 extracts and analyzes flow identification information including destination information, source information, and route information included in the header part. On the basis of this analysis results, the downstream frame processor 1210 determines whether the conversion of the header information is necessary, or not, and if necessary, determines a conversion method (assignment, deletion, transmission, or conversion of the header information). This determination is conducted by referring to a part (destination information) or all of the flow identification information of the received packet, and checking the information against a route table (not shown) held in the downstream path information DB 1211. In the route table are recorded the transfer destination route corresponding to the header information of the received frame and information related to the header information conversion in association with each other. Referring to the header conversion contents thus obtained, the GEM header generator 12103 generates GEM frame header information. The GEM header generator 12103 transfers the processed header information (for use in transfer to ONU 20) is transferred to the GEM frame generation unit 12104.

In the processing (2), the downstream light intensity map (downstream BW map) generation unit 12107 acquires and analyzes the downstream packet header part from the packet buffer 12101. The downstream BW map generation unit 12107 requests the transmission light intensity acquisition unit 12106 to determine the transmitting light intensity on the basis of the header information. The transmission light intensity acquisition unit 12106 requests the optical amplification factor determination unit 1092 provided in the PON controller 1000 to designate an appropriate light intensity for transmitting the downstream packet. The optical amplification factor determination unit 1092 acquires the optical amplification factor corresponding to the destination ONU of the subject packet, with reference to the optical amplification factor information DB 1091. The optical amplification factor determination unit 1092 notifies the transmission light intensity acquisition unit 12106 in the downstream frame processor 1210 of the acquired optical amplification factor.

The optical amplification factor information DB 1091 has a function of calculating the light intensities required for communication with the individual ONUs on the basis of the communication distance measurement using the ranging process implemented when starting up the ONU. The DBA processor 1062 included in the ONU management unit 1060 represents a functional block for calculating a timing at which the upstream signal (packet) is transmitted to the individual ONUs. Like the DBA for assigning the bandwidth to the upstream signal used in the related-art PON, the calculated bandwidth assignment status is held in the ranging/DBA information BD 1061 until the upstream frame once assigned has been received.

The GEM frame generation unit 12104 combines the GEM frame header information with data (frame payload) stored in the packet buffer 12101 to generate a downstream GEM frame. The GEM frame generation unit 12104 further combines the downstream GEM frames to generate each downstream frame of 125 microseconds as a unit. As one of functions required at this stage, a downstream transmission schedule (that is, downstream light intensity map) determination function for determining the insertion order of the GEM frame is provided in the GEM frame generation unit 12104. When the downstream transmission schedule is determined to determine the light intensity map configuration, and the light map is inserted into an appropriate portion of the header information. A specific frame configuration will be described later.

Subsequently, a description will be given of the operation of the OLT 10 when the downstream light intensity map is periodically notified to the ONU. The PON controller 1000 of the OLT 10 holds the transmission start time and the transmission period of the downstream optical signal transmission schedule (also called "downstream light intensity map" and "downstream BW map") designated when starting up the individual ONUs 20. At first, those information is held in a register (not shown) provided in an ONU state management unit 1063. After the ONU 20 has started up, the ONU state management unit 1063 notifies the downstream BW map transmission controller 12108 of the information. This information is recorded by the downstream BM map transmission controller 12108 in the register (not shown) within the downstream BW map transmission controller, and the downstream intensity map transmission interval DB 12109. The downstream intensity map control counter 12110 refers to the transmission start time for each ONU or each ONU group provided in the downstream BW map transmission controller, and the transmission interval provided in the downstream intensity map transmission interval DB 12109, resets the counter, and newly starts the count toward a subsequent notice time when the transmission start time or the transmission interval counter value reaches a given value.

The downstream BW map controller 12108 notifies the downstream BW map generation unit 12107 of the downstream light intensity map transmission time, periodically referring to the downstream intensity map control counter, or periodically receiving the control signal notice from the downstream intensity map control counter. With this operation, the downstream BW map generation unit 12107 determines the downstream signal transmission schedule (that is, the downstream light intensity map insertion position to the downstream signal) to be notified to the individual ONUs or ONU groups of at the downstream light intensity map transmission time, and notifies the GEM frame generation unit 12104 of the determined schedule.

Figure 5:
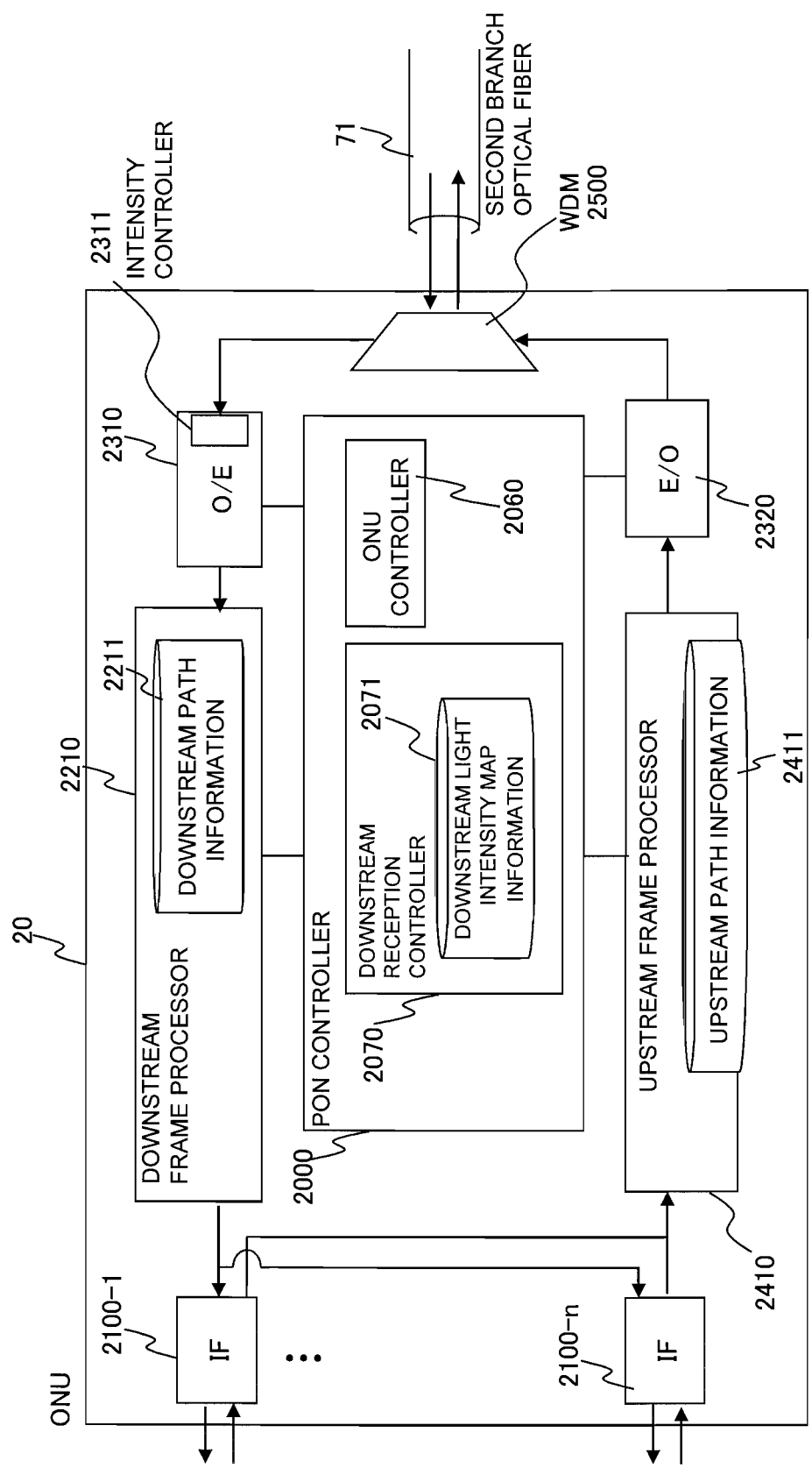
FIG. 5 is a block diagram illustrating a configuration of each ONU.

Referring to FIG. 5, the ONUs 20 of the PON system will be described. Referring to FIG. 5, each of the ONUs 20 includes a WDM 2500, an O/E 2310, a downstream frame processor 2210, n IFs 2100, an upstream frame processor 2410, an E/O 2320, and a PON controller 2000. The O/E 2310 includes an intensity controller 2311. The downstream frame processor 2210 holds downstream path information 2211. The upstream frame processor 2410 holds upstream path information 2411. The PON controller 2000 includes a downstream reception controller 2070 and an ONU controller 2060. The downstream reception controller 2070 holds downstream light intensity map information 2071.

The upstream signal from a terminal (not shown) accommodated in the ONU 20 to the PON is input to the IFs 2100-1 to 2100-*n* which are called "user network interfaces" (UNI) from the subscriber network 50. The subscriber network 50 is frequently configured by the LAN or the packet network. Accordingly, the n IFs 2100 are frequently each configured by an Ethernet interface of 10/100 Mbit/s or 1 Gbit/s. However, the present invention is not limited to this configuration.

The configuration and the operation of processing the downstream signal and the upstream signal in the ONU 20 are substantially identical with the configuration and the operation of processing the downstream signal and the upstream signal in the OLT 10 described with reference to FIGS. 3 and 4. In the downstream signal, the downstream frame processor 2210 has the downstream path information DB 2211 for determining the processing including the destination determination, and the conversion and assignment of the header information on the basis of the header analysis, and converts the GEM frame received from the PON interval 80 into an Ethernet packet, and outputs the converted Ethernet packet to an terminal of the ONU 20. In the upstream signal, the upstream frame processor 2410 having the upstream path information DB 2411 converts the Ethernet packet received from the terminal into a GEM frame, and outputs the received GEM frame toward the OLT 10.

As the downstream signal receiving function of the ONU 20, the O/E 2310 has the intensity controller 2311. The intensity controller 2311 monitors the intensity of the optical signal received from the OLT 10 through the optical fiber 70 and the branch optical fiber 71, and adjusts the intensity to a value appropriate for the optical receiver configuring the O/E 2310 of the ONU 20. Also, the intensity controller 2311 blocks the optical signal with a high intensity, and prevents the optical receiver of the O/E processor 2310 from failing. The intensity controller 2311 operates according to an instruction from the ONU controller 2060. Also, the ONU controller 2060 stores transmission intensity schedule information (downstream light intensity map) of the downstream signal obtained as a result of the frame processing through the downstream frame processor 2210 in the downstream light intensity map information DB 2071. On the basis of the transmission intensity schedule information of the downstream signal, the ONU controller 2060 can receive the downstream signal while the downstream signal of the appropriate light intensity to be received by the subject ONU is being transmitted (or while the signal of the light intensity lower than the appropriate light intensity is being transmitted). The ONU controller 2060 controls the intensity controller 2311 so as to block the light in other cases. The operation of the intensity controller 2311 will be described in detail later.

The ONU controller 2060 represents a functional block used for parameter setting or the communication state management when starting up the ONU 20, according to an instruction from the OLT 10. The ONU controller 2060 executes the analysis of the received frame, the management of maintenance and management information on the device, and the processing of determining whether communication (reply) with the OLT 10 is necessary, or not.

Figure 6:
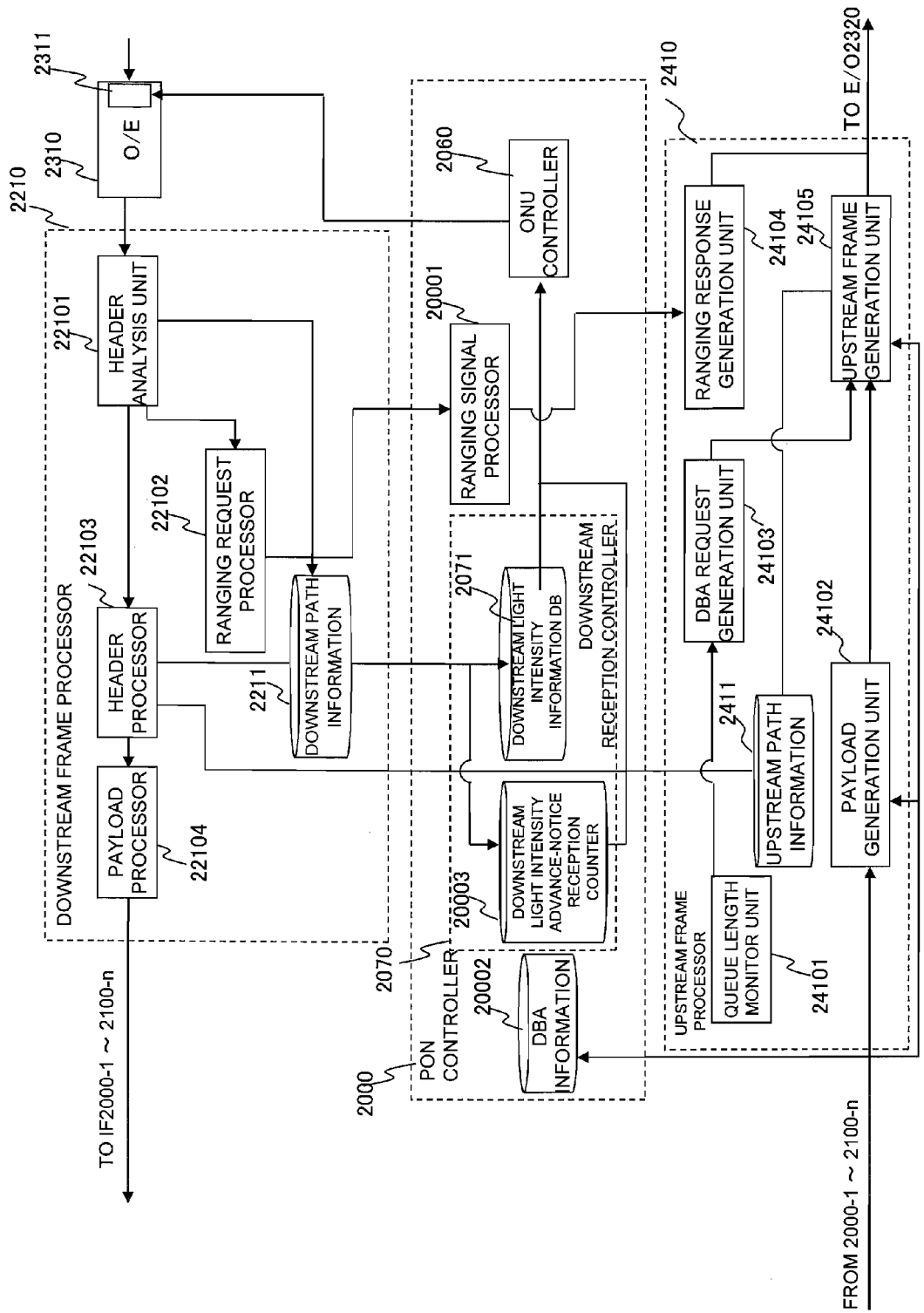
FIG. 6 is a block diagram illustrating the details of a downstream frame controller, a PON controller, and an upstream frame processor in each ONU.

Referring to FIG. 6, a description will be given of the detailed functional blocks of the downstream frame processor 2210, the PON controller 2000, and the upstream frame processor 2410 in the ONU 20. Referring to FIG. 6, the downstream frame processor 2210 includes a header analysis unit 22101, a ranging request processor 22102, a header processor 22103, a payload processor 22104, and the downstream path information 2211.

The PON controller 2000 includes the ONU controller 2060, the downstream reception controller 2070, a ranging signal processor 20001, and DBA information 20002. The downstream reception controller 2070 holds the downstream light intensity information DB 2071 and a downstream light intensity advance-notice reception counter 20003.

The upstream frame processor 2410 includes a queue length monitor unit 24101, a payload generation unit 24102, a DBA request generation unit 24103, a ranging response generation unit 24104, and an upstream frame generation unit 24105.

In the downstream signal received through the WDM 2500, (1) the header analysis unit 22101 determines whether a frame is addressed to the subject ONU, or not. Also, when the frame is addressed to the subject ONU, (2) the header analysis unit 22101 searches the header information on the frame. In this example, information included in the downstream frame is roughly classified into two categories. One of the information is a signal for PON interval control which is to be terminated by the ONU 20. The other information is a main signal frame such as user data. The main signal frame is to be transferred to a device connected to the IFs 2100-1 to 2100-*n* through the ONU 20.

As the former typical operation, there is signal transmission and reception during the ranging processing. The header analysis unit 22101 transfers the ranging request to the ranging request processor 22102 upon detecting that the signal is a ranging request from the OLT 10 toward the ONU 20. The ranging request processor 22102 records a time at which the ranging request signal is received. The ranging request processor 22102 further generates an internal signal (reply request notice) for giving notice that the ranging request is received. The ranging request processor 22102 transfers the generated reply request notice together with the reception time to the ranging signal processor 20001. In the GPON, it is stipulated that a reply is transmitted to the OLT about 35 microseconds after the ranging request has been received.

The latter typical operation is to transfer user data in a downstream direction. One or plural pieces of user data is included in the payload part of the PNON downstream basic frame in the form of the GEM frame. The ONU 20 refers to the header information on the respective GEM frames in the header analysis unit 22101, and processes the subject GEM frame when an identifier (Port-ID) indicating that the header information is addressed to the subject ONU exists within the GEM header. More specifically, the ONU 20 changes a data format in order to transfer the signal received as the GEM frame to devices connected to the IFs 2100-1 to 2100-*n* of the ONU 20. The ONU 20 refers to the address fields (more specifically, Ethernet destination addresses and IP destination addresses) indicative of the respective destinations of data within the GEM header. The ONU 20 then determines the IF 2100 (more specifically, physical addresses of the IFs, or IF identifiers used within the device (mounting dependency)) to which the respective data is to be transmitted. In signal transmission from the downstream frame processor 2210 to the IFs 2100, there is a need to change or add the header information on the user data frame. That is, the VLAN tag value assigned to the Ethernet frame is changed, or the VLAN tag is inserted. In those processing, the downstream path information DB 2211 is referred to. For that reason, the downstream path information DB 2211 holds the association of the destination information on the received downstream frame with the destination IF identifier, and a header information conversion rule for the association. On the basis of the downstream path information DB 2211, the header processing required for the system setting is conducted in the header processor 22103 as described above, and a header format of the downstream frame for an external device is created. Thereafter, in the payload processor 22104, the header format is combined with the user data included in the payload part of the frame to constitute the downstream frame format for transfer, and the frame is transferred to the IFs 2100-1 to 2100-*n*.

Upon receiving the replay request notice from the ranging request processor 22102, the ranging signal processor 20001 determines a time at which a ranging response is transmitted (in fact, the time can be calculated with the use of the number of clocks within the device) on the basis of the ranging request reception time included in the notice. The ranging signal processor 20001 transmits the instruction generation and transmission of the ranging response to the ranging response generation unit 24104. The normal ranging processing is implemented only when starting up the ONU 20. However, when a communication failure such as an upstream signal synchronization failure during operation is detected, the ranging processing may be again implemented. In this situation, the ranging signal processor 20001 of the PON controller 2000 notifies the upstream frame controller that the upper user data frame transmission is stopped at the time of transmitting the ranging response. In FIG. 6, the processing during the normal operation is illustrated, and a flow of the control signal at the time of the communication failure is not illustrated.

The ranging response generation unit 24104 generates and transmits the ranging response according to an instruction from the ranging signal processor 20001. In this situation, the ranging response generation unit 24104 conducts the timing control so as to start the transmission to the E/O 2320 at a time designated by the ranging signal processor.

Subsequently, a description will be given of the processing when the ONU 20 receives the downstream signal in the configuration of FIG. 1. Referring to FIG. 6, the light receiving device used in the ONU 20 has predetermined a signal identifiable S/N ratio level and receivable light intensity upper limit. The downstream signal that is normally received in the O/E processor 2310 and the header analysis unit 22101 and whose header is recognized is held in a frame buffer (not shown) provided in the downstream frame processor 2210 if the signal is not a ranging request. The header processor 22103 analyzes the header information on the signal. In this header analyzing processing, when the light intensity map addressed to the subject ONU 20 is detected, the header processor 22103 notifies the downstream light intensity map information DB 2071 of the information, and holds the information in the downstream light intensity map information DB 2071. In determining whether the downstream light intensity map is addressed to the subject ONU, or not, the header processor 22103 refers to the downstream path information DB 2211. The specific operation is conducted as described above, and therefore its description will be omitted. The downstream light intensity map lists timings (represented by time or the number of clocks (bytes)) at which the ONU 20 is to receive the downstream signal. Referring to the downstream light intensity information DB 2071, the ONU controller 2060 instructs the intensity controller 2311 provided in the O/E processor 2310 about the reception timing (arrival time at the ONU) of the downstream optical signal to be next received. The O/E processor 2310 blocks the downstream optical signal or opens the light receiving part according to the instruction. As a result, the ONU 20 can prevent the failure of the optical device in the O/E processor 2310, and issuance of unnecessary communication abnormality warning (when receiving a signal that is a frame addressed to the ONU other than the subject ONU and is low in S/N ratio).

In this embodiment, the downstream light intensity map is transmitted from the OLT 10 to the ONUs 20 as will be described later. Each of the ONUs 20 holds the timing at which the downstream light intensity map information is received in the downstream light intensity advance-notice reception counter 20003. This timing information is set from the OLT 10 at the time of starting up the ONU 20 if the timing information is not changed during the operation. This information can be set for each ONU group or each ONU. Also, the use status of the communication bandwidth for each ONU can be changed during the operation, or the timing information can be changed according to a change in the communication traffic. That is, the downstream light intensity map transmission interval can be dynamically changed without always transmitting the downstream light intensity map at a given interval. The downstream light intensity information is supplied from the OLT 10. When the ONU 20 confirms that the downstream light intensity information is the downstream light intensity map addressed to the subject ONU 20 according to the above series of processing, the ONU 20 records the information in the downstream light intensity map information DB 2071 (and the downstream light intensity advance-notice reception counter 20003), and counts the time by the downstream light intensity advance-notice reception counter 20003. The downstream light intensity advance-notice reception counter 20003 counts the downstream light intensity map reception time, and when the count time approaches the light intensity map reception time, the downstream light intensity advance-notice reception counter 20003 notifies the ONU controller 2060 of this fact. Likewise, in the downstream light intensity map information DB 2071, when the count time approaches the intensity map reception time, the downstream light intensity advance-notice reception counter 20003 notifies the ONU controller 2060 of this fact. Upon receiving this notice, the ONU controller 2060 releases the intensity controller 2311. The PON controller 2000 holds an operation start (downstream signal reception time) time, a downstream light intensity map reception time first received after the operation starts, and the reception interval of the downstream light intensity map, which are set at the time of starting up the ONU 20 (register/storage used for intended purpose is not shown).

Subsequently, the processing of the upstream signal in the ONU 20 will be described. The signals received by the IFs 2100-1 to 2100-$n$ are accumulated in the ONU 20 once, and thereafter transferred to the OLT according to the upstream frame transmission timing instructed from the OLT. A procedure for configuring the upstream signal is substantially identical with the analysis of the downstream signal, and divided into the header information processing and the payload information processing. The information input to the ONU 20 as the upstream signal is accumulated in a frame buffer (not shown) provided in the upstream frame processor once. The payload generation unit 24102 transmits, divides, or combines the payload parts in the information in order to configure the payload of the GEM frame. The processing in this stage depends on the upstream signal transmission bandwidth (generally, converted into the number of bytes for use) instructed from the OLT. On the other hand, the header information is subjected to two-stage processing. First-stage processing configures the GEM header of the upstream signal received from the IFs 2100. In the GEM header are inserted the Port-ID assigned to the ONU 20 in advance as an identifier of the ONU 20. In determination of the Port-ID, the upstream path information DB 2411 is referred to. Also, in configuring the upstream frame, the ONU 20 notifies the OLT 10 of an upstream bandwidth request called "DBA report". The upstream bandwidth request is stored in the header of the upstream frame. In the upstream bandwidth request, specifically, data accumulation amount of an upstream signal transmission wait queue within the ONU 20 is determined by the queue length monitor unit 24101, and the upstream bandwidth request amount is determined by the DBA request generation unit 24103, and notified to the OLT 10. The upstream bandwidth request represents information for receiving transmission permission from the OLT 10 according to the amount of data. The upstream frame generation unit 24105 combines the upstream signal header information including the upstream bandwidth request with the payload generated by the payload generation unit 24102 to complete an upstream frame. Thereafter, the upstream frame generation unit 24105 transmits the upstream frame through the E/O unit 2320 at timing corresponding to upstream signal transmission permission (held in the DBA information DB (not shown) provided in the ONU 20) from the OLT 10.

Figure 7:
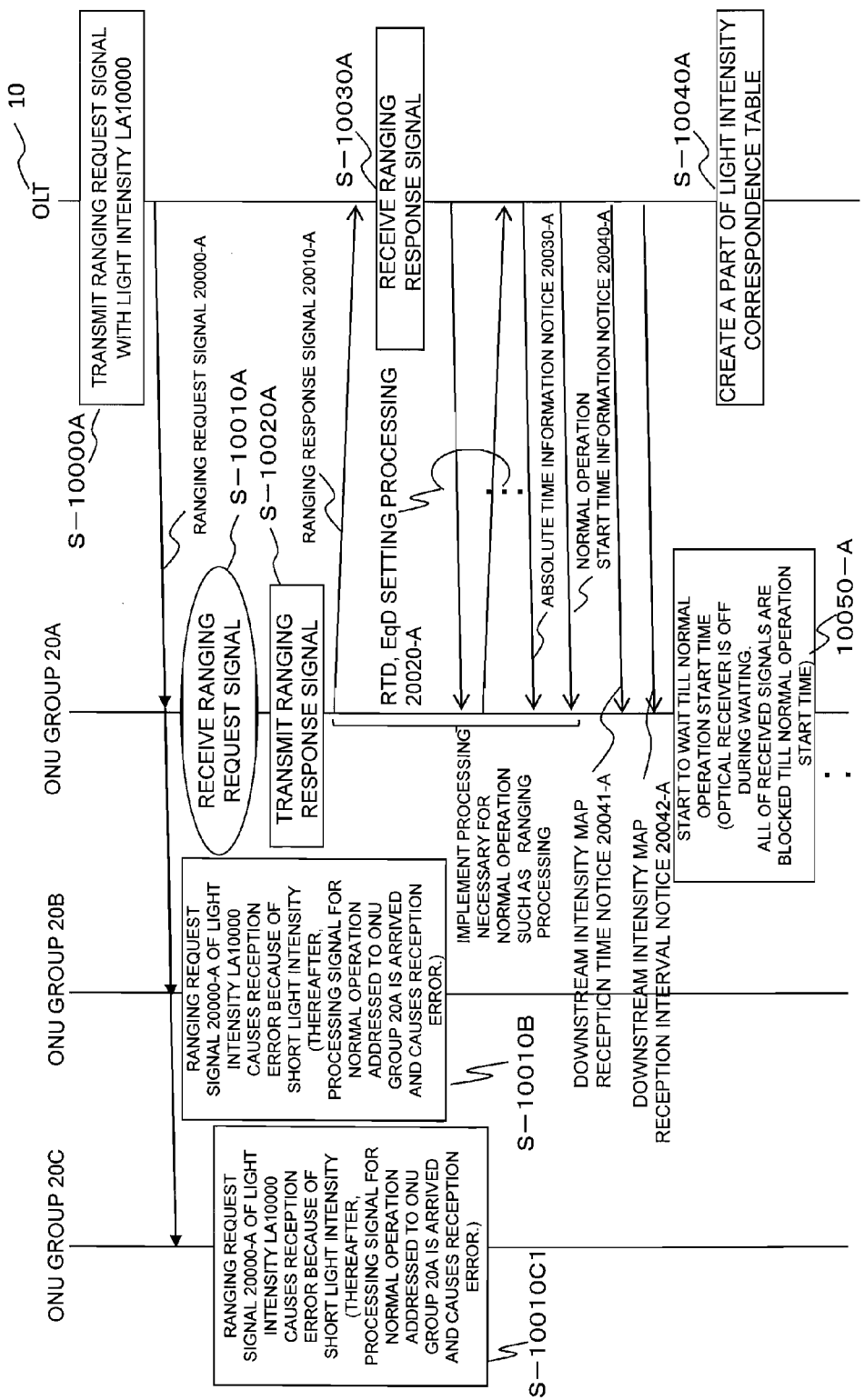
FIG. 7 is a sequence diagram illustrating ranging operation conducted between the OLT and each ONU belonging to an ONU group 20A.
Figure 8:
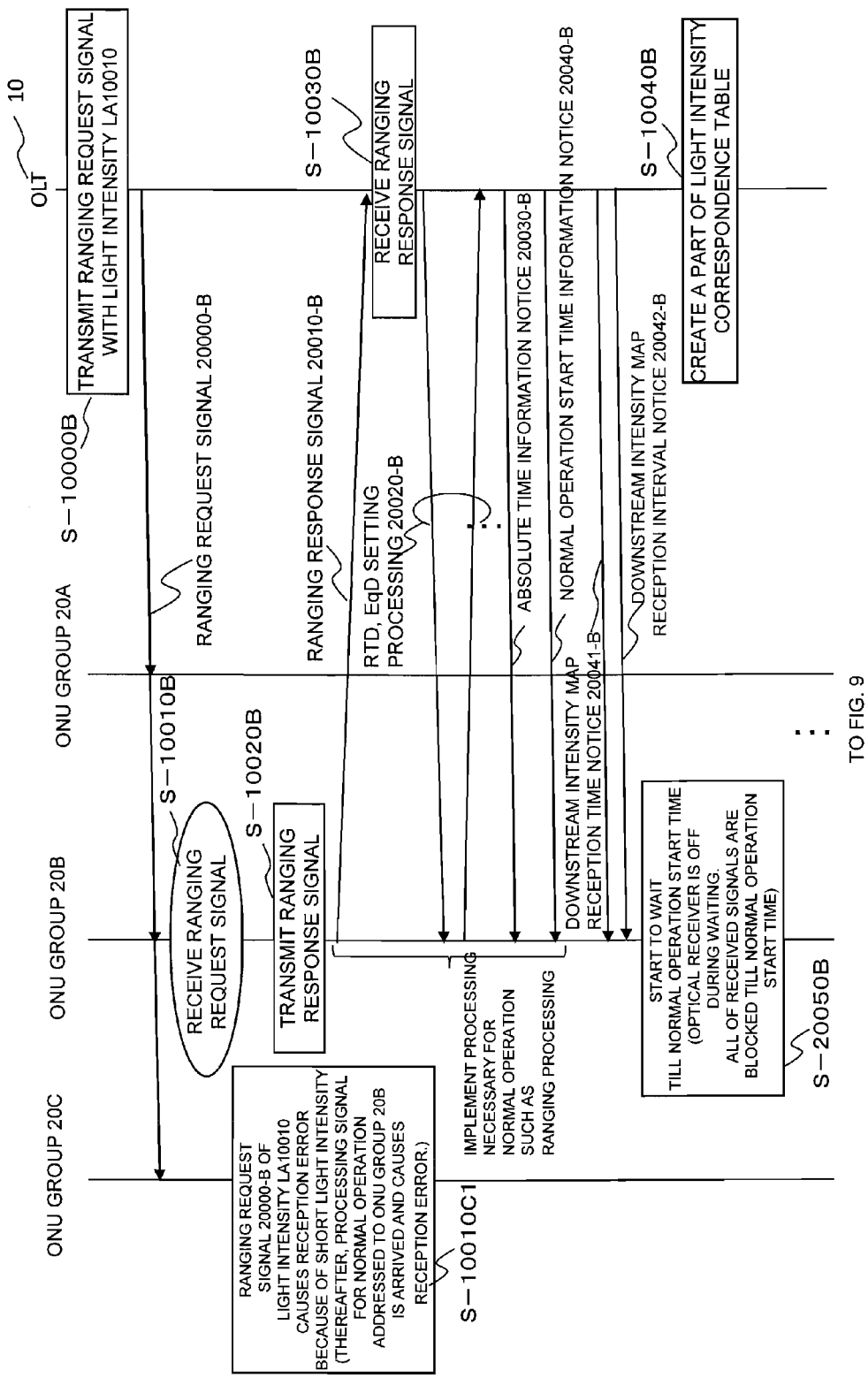
FIG. 8 is a sequence diagram illustrating ranging operation conducted between the OLT and each ONU belonging to an ONU group 20B.
Figure 9:
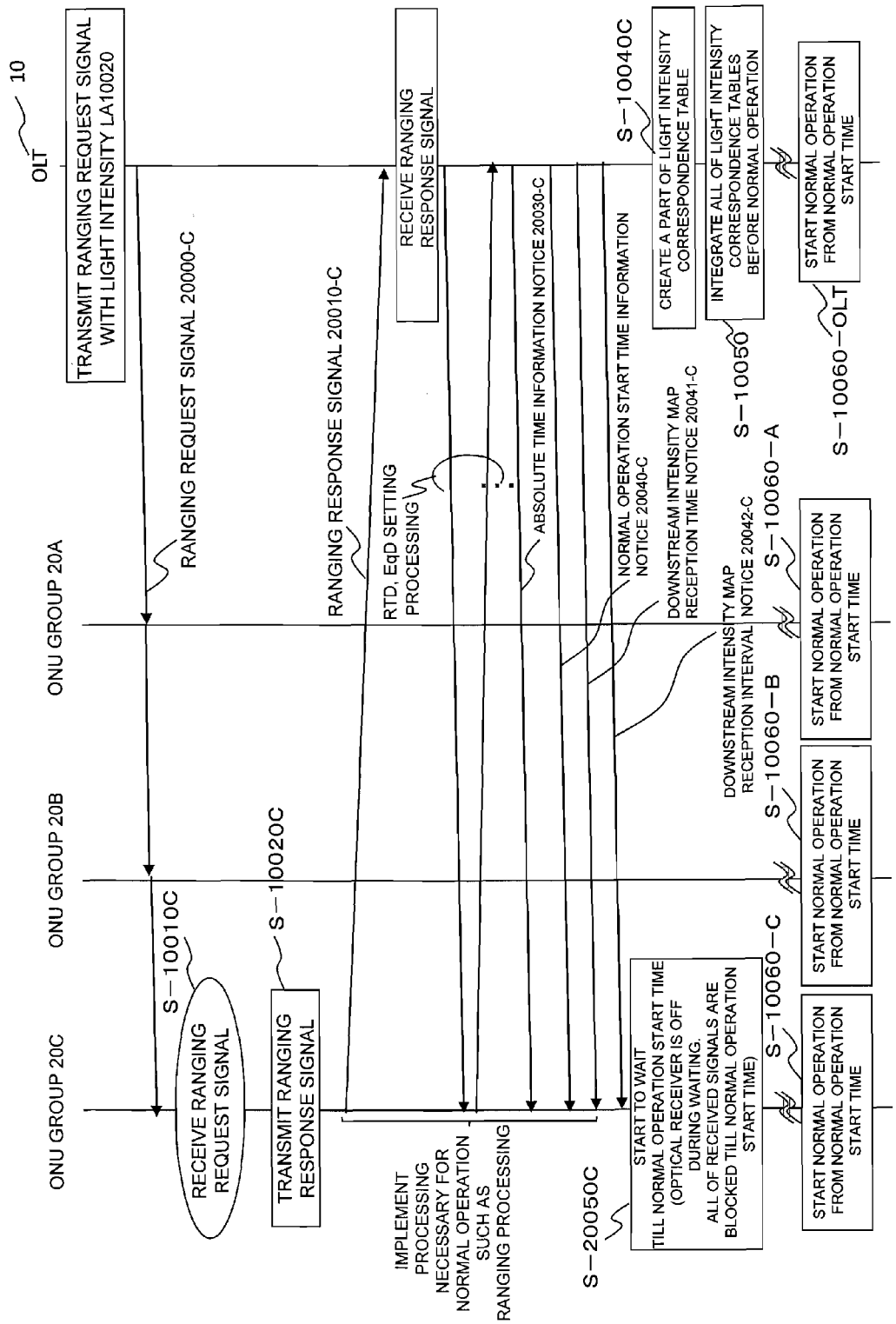
FIG. 9 is a sequence diagram illustrating ranging operation conducted between the OLT and each ONU belonging to an ONU group 20C.

Referring to FIGS. 7, 8, and 9, a description will be given of the ranging operation conducted between the OLT and the respective ONUs at the time of starting up the PON system. In this description, start-up processing from a status in which the OLT 10 does not grasp the distances to the respective ONUs 20 in the beginning of the operation is assumed.

Referring to FIG. 7, when the OLT 10 first confirms the connection to the ONUs, the OLT 10 transmits a ranging request signal to the respective ONUs according to a prescribed ONU start procedure. In this situation, the OLT 10 does not yet understand how far the respective ONUs are disposed. Under the circumstances, the OLT 10 transmits a ranging request signal 20000-A to the respective ONUs first with a minimum light intensity (it is assumed that this intensity is a light intensity LA 10000) (S-10000A). In this situation, because of the transmission distance between the OLT and the ONUs, and the loss of the light signal intensity and the S/N ratio due to the split, each ONU can correctly receive the ranging request signal 20000-A transmitted with the above-mentioned minimum light signal LA10000, or there occurs a receive error (reception disable) due to short of reception sensitivity of the O/E 2310 loaded on each ONU. In this embodiment, the ONUs of the ONU group 20A can each receive the ranging request signal 20000-A (S-10010A). On the other hand, the respective ONUs of the remaining ONU groups 20B and 20C cannot each receive the ranging request signal 20000-A (S-10010B, S-10010C1).

The ONUs of the ONU group 20A transmit respective ranging response signals 20010-A to the OLT 10 (S-10020A). The OLT 10 that has received the ranging response signal 20010-A (S-10030A) determines that communication with the ONU of the ONU group A which is a source of the ranging response signal 20010-A is enabled with the light intensity at the time of transmitting the ranging request signal. The OLT 10 measures the round trip delays RTD to the respective ONUs belonging to the ONU group 20A with the optical signal LA10000, and determines a value of an equivalent delay EqD on the basis of the measurement results (20020-A). The above processing is based on the disclosure of the above-mentioned document "ITU-T Recommendation G.984.3". At the same time, the OLT 10 determines communication times to the respective ONUs by using the results of the ranging processing. The communication time thus obtained is used for setting an absolute (OLT side management) time to each ONU from the OLT 10. The absolute time contributes to that the respective ONUs correctly recognize the arrival time information related to the frames addressed to the respective ONUs indicated within the light intensity map which will be described in detail later. This is because since each ONU can obtain the time information to be set in the subject ONU on the basis of the time information (absolute time) managed at the OLT side, a boundary time of the base frame period from the OLT 10, or a time at which the subject frame arrives at each ONU can be set in the ONU. As described above, in the present invention the method of setting the absolute time, is not particularly limited. For example, the time setting method disclosed in the above-mentioned document "ITU-T Recommendation G.984.3" can be applied.

The OLT 10 that has set the absolute times to the respective ONUs of the ONU group 20A (20030-A) instructs the respective ONUs that have communicated with the OLT 10 up to that time to start the receiving operation from a scheduled start time of the normal operation, and set the intensity controllers 2311 within the ONUs so as to block all of the received signals up to that time (20040-A, 10050-A). Also, subsequent to the time setting and the operation start (downstream signal reception start) time notice, the OLT 10 sets the reception start time and the reception interval of the downstream light intensity map to be received by the ONU 20 (20041-A, 20042-A). The reception time of the downstream light intensity map received first after the operation is dealt with as a parameter that is identical with the receiving operation start time or that can be calculated from the time. The above setting can be implemented even in a method that does not conduct two kinds of time notices. The OLT 10 creates a part of the optical intensity table (S-10040A).

Referring to FIG. 8, a description will be given of the ranging operation conducted between the OLT and the respective ONUs belonging to the ONU group 20B at the time of starting up the PON system. A sequence of FIG. 8 represents a procedure of the ranging processing on the ONU group 20B, which is conducted after completing the ranging processing on the ONU group 20A illustrated in FIG. 7.

The ONUs of the ONU group 20B and the ONU group 20C, which could not correctly receive the ranging request signal transmitted with the minimum light signal LA10000 due to the influence of the distance between the OLT and the ONUs or the transmission loss, maintain a state of continuously waiting for the ranging request signal from the OLT 10. The OLT 10 that has completed definition of the ranging processing and the absolute times to the respective ONUs due to the optical signal LA10000 then changes the light intensity to a light intensity LA10010 higher in the light intensity than the LA 10000 by one level, and again transmits the ranging request signal 20000-B to the respective ONUs (S-10000B). In this situation, the ONUs of the ONU group 20A which have completed the ranging processing previously, have a possibility that there occurs a drawback that the optical receivers of the subject ONUs fail or are damaged because the light intensity LA10010 higher than the optical signal LA10000 by one level arrive at those ONUs. However, the ONUs of the ONU group 20A are instructed by the OLT 10 to block all of the received signals till the scheduled start time of the normal operation. Therefore, the ONUs of the ONU group 20A block the signal with the light intensity LA10010 which currently arrive at the ONUs to protect the optical receives of the respective ONUs (10050-A). On the other hand, the ONUs of the ONU group 20C cannot each receive the signal as an error signal because the receiving sensitivity capability of the O/E 2310 loaded on each ONU is short like the above description. However, the ONUs of the ONU group 20B can first recognize the ranging request signal 20000-B by the signal transmitted with the light intensity LA10010. Therefore, the ONUs of the ONU group 20B conducts the ranging processing and setting of the absolute time information with respect to the OLT 10. In this situation, the processing contents are identical with the processing between the OLT and the respective ONUs which is conducted with the light intensity LA 10000, and therefore will be omitted. Thereafter, the ONUs of the ONU group 20B are instructed to set the intensity controller 2311 within each ONU so as to block all of the reception signals till the scheduled start time of the normal operation (20020-B). The OLT 10 creates a part of the light intensity table (S-10040B).

Referring to FIG. 9, a description will be given of the ranging operation conducted between the OLT and the respective ONUs belonging to the ONU group 20C at the time of starting up the PON system. FIG. 9 illustrates a sequence of the ranging operation conducted on the ONU group 20C, which is conducted after the ranging processing is conducted on the ONU groups 20A and 20B illustrated in FIGS. 7 and 8.

Referring to FIG. 9, the OLT 10 that has completed the above-mentioned processing with the light intensity LA10010 further transmits the ranging request signal with a light intensity LA10020 further higher by one level, and conducts the same processing as that described above with respect to the ONU group 20C that has returned the ranging response signal (the processing process in this situation is identical with that of the ONU group 20A and the ONU group 20B, and therefore will be omitted). The ONUs for which the signal of the light intensity LA10020 is too intense (the ONU group 20A and the ONU group 20B that have completed a series of processing with respect to the OLT 10 with the light intensity LA10000 and the light intensity LA10010) block the reception signals according to an instruction from the OLT 10. Therefore, no drawback such as failure or breaking occurs in the optical receiver of the subject ONU. In this way, the OLT 10 gives notice of the ranging processing and the absolute times while gradually increasing the intensity of the optical signal. As a result, the OLT 10 can implement the ranging processing and the setting of the absolute times of all the ONUs 20 under the OLT10. The OLT 10 creates a part of the light intensity table (S-10040C). The OLT 10 merges the light intensity tables for completion (S-10050).

Finally, the OLT 10 and all of the ONUs 20 move to the normal operation (S-10060-OLT, S-10060-A, S-10060-B, and S-10060-C). In this situation, as the normal operation start time, times when the signals of the respective light levels first arrive at the ONUs 20 (corresponding to 16001A for the ONU group 20A, 16001B for the ONU group 20B, and 16001C for the ONU group 20C in FIG. 17 which will be described later) are designated, all of the ONUs 20 enable reception without occurrence of an error or failure from the downstream frame that arrives immediately after the operation starts.

In the above description, 2.5 Gbit/s which is the communication bit rate of the current GPON is assumed. In the system mixed with the GPON of the communication bit rate 10 Gbit/s which is a next generation standards (a system in which the OLT 10 can be compliant with both of the communication bit rates 2.5 Gbit/s and 10 Gbit/s, and the ONU compliant with the communication bit rate 2.5 Gbit/s and the ONU compliant with the communication bit rate 10 Gbit/s are mixed together in the ONUs under the OLT 10), after the above-mentioned processing operation for each optical level is conducted at the communication bit rate 2.5 Gbit/2, the processing operation is conducted at the communication bit rate 10 Gbit/s. More specifically, first, after the above-mentioned processing before the normal operation which is conducted with the light intensity LA10000 is implemented at the communication bit rate 2.5 Gbit/s, the communication bit rate is changed to 10 Gbit/s to again implement the processing. In the system high in the communication bit rate, because the signal attenuation and the wavelength dispersion on the optical fiber are more significant than the system of the low bit rate in optical transmission characteristics, oscillation with higher intensity is required from the OLT 10. For example, when the transmission at the same distance is conducted at 2.5 Gbit/s and 10 Bit/s, the light intensity difference between the transmitter side and the receiver side is theoretically about 16 times. For that reason, when 2.5 Bbit/s compliant ONU is first started up, the communication bit rate 2.5 Gbit/s compliant ONU which can be dealt with by light intensity LA10000, and the communication bit rate 10 Gbit/s compliant ONU can move to the normal operation. Thereafter, as in the case where all of the ONUs 20 are compliant with the communication bit rate 2.5 Gbit/s, the light intensity is changed to the light intensity LA10000, the light intensity LA10010, and the light intensity LA10020 in the stated order, to conduct the above-mentioned processing. In the above description, the next-generation standards GPON is 10 Gbit/s in the communication bit rate. However, this shows an example, and the communication bit rate of the next-generation standard GPON is not limited to 10 Gbit/s. This is one model when the PON systems different in the communication bit rate are mixed together.

In this embodiment, the OLT 10 gradually increases the light intensity at the time of transmitting the downstream signal, and the ranging is conducted from the ONU closer in the connection distance to the ONU farther therefrom in turn. In this situation, there are roughly two methods of recognizing the ranging processing completion with respect to the ONU group at a given distance. One method is that a predetermined serial No. (SN) list is held within the OLT 10 at the time of connecting the ONU (at the time of distributing the ONUs to the users), and whether the start-up of the ONUs corresponding to the SNs in the lists prepared in the respective connection distances have been completed, or not, is referred to. Another method is that a series of start-up processing is periodically implemented, and whether the ONU newly connected exists, or not, is known by polling. In this method, for example, in the start-up from the ONU group 20A to the ONU group 20C, one ONU per each group is sequentially polled with respect to all of SNs (except for the already connected ONUs) with a change in the SNs bit by bit (in this case, the OLT 10 does not know the SN list in advance). Alternatively, there is a method in which when the ONU group 20A has been polled with respect to all of the SNs, the processing moves to the search of the ONU group 20B.

Figure 10:
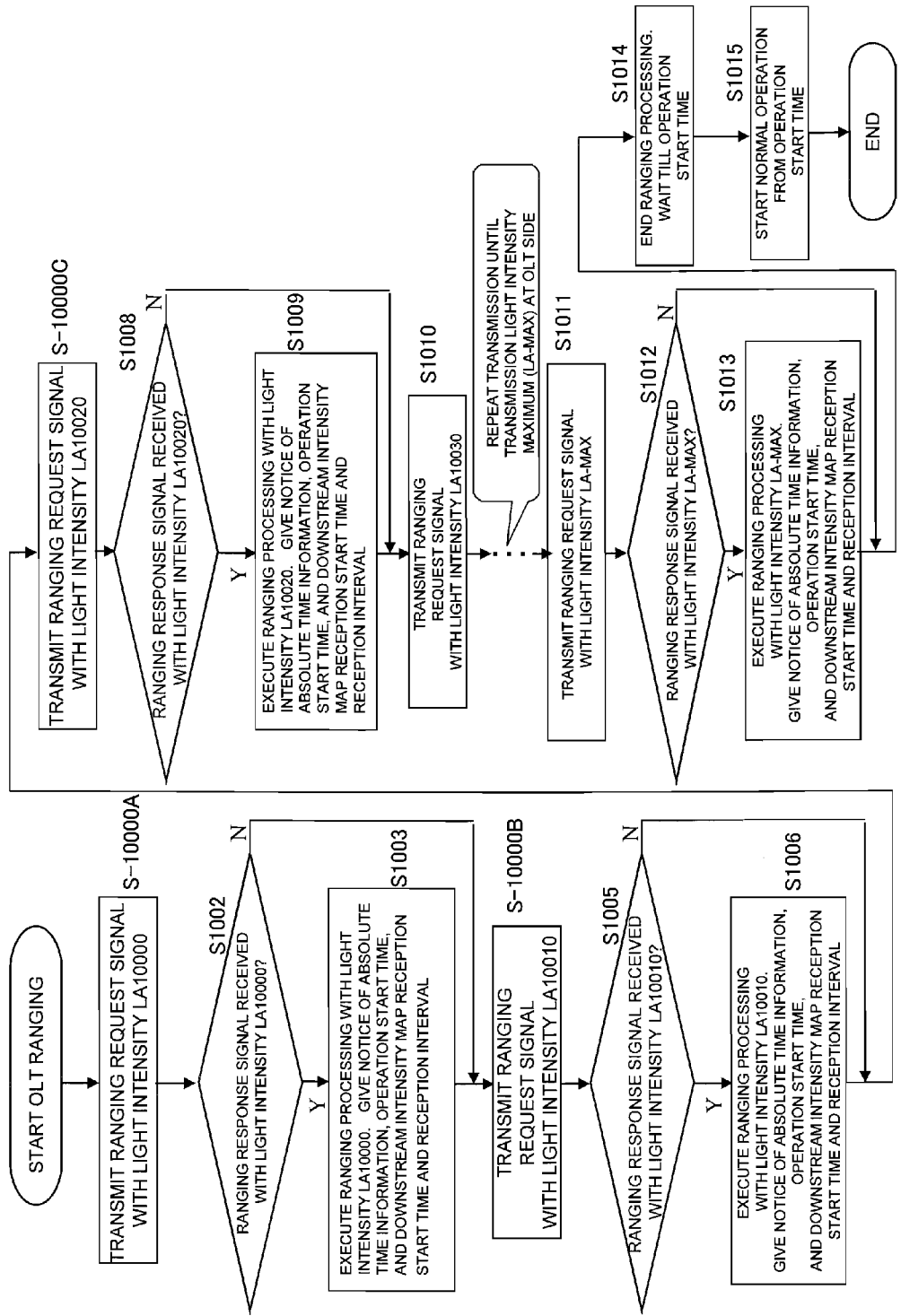
FIG. 10 is a flowchart illustrating a ranging operation procedure of the OLT.

Referring to FIG. 10, the ranging operation of the OLT 10 will be described. Referring to FIG. 10, Steps 10000A to 1003 correspond to the sequence processing of FIG. 7. Likewise, Steps 10000B to 1006 correspond to the sequence processing of FIG. 8, and Steps 10000B to 1009 correspond to the sequence processing of FIG. 9. In more detail, Step 1002 is confirmation processing that is executed within a time until receiving the ranging response signal S-20030A from S-10000A of FIG. 7. As a result of Step 1002, when it can be confirmed that the ranging response can be correctly received, a series of ONU setting processing from 20020-A to S-10040A are conducted. The series of processing is described as Step 1003 as a whole in the figure.

The same is applied to the correspondence of FIGS. 8 and 9. Step 1005 is confirmation processing that is executed within a time until receiving the ranging response signal S-10030B from S-10000B of FIG. 8. Further, as a result of Step 1002, when it can be confirmed that the ranging response can be correctly received, the OLT 10 conducts a series of ONU setting processing from 20020-B to S-10040B. The same is applied to the correspondence with FIG. 9, and therefore its description will be omitted.

As described above, the start-up processing is conducted in the order from the ONU 20 group close to the OLT 10, and this flow is completed at a stage of completing the ranging processing on the ONU group farthest from the OLT 10. The step 1010 of FIG. 10 is processing for starting the ranging processing on the next farther ONU group from the ONU group 20C. The ranging processing on the farthest ONU group corresponds to Steps 1011 to 1013. Thereafter, after confirmation of the ranging processing completion and waiting (S1014) till the operation start time, the operation starts (S1015). In the ranging completion confirmation and the waiting processing of Step 1014, the processing of integrating the light intensity tables illustrated in FIG. 9 is implemented.

Figure 11:
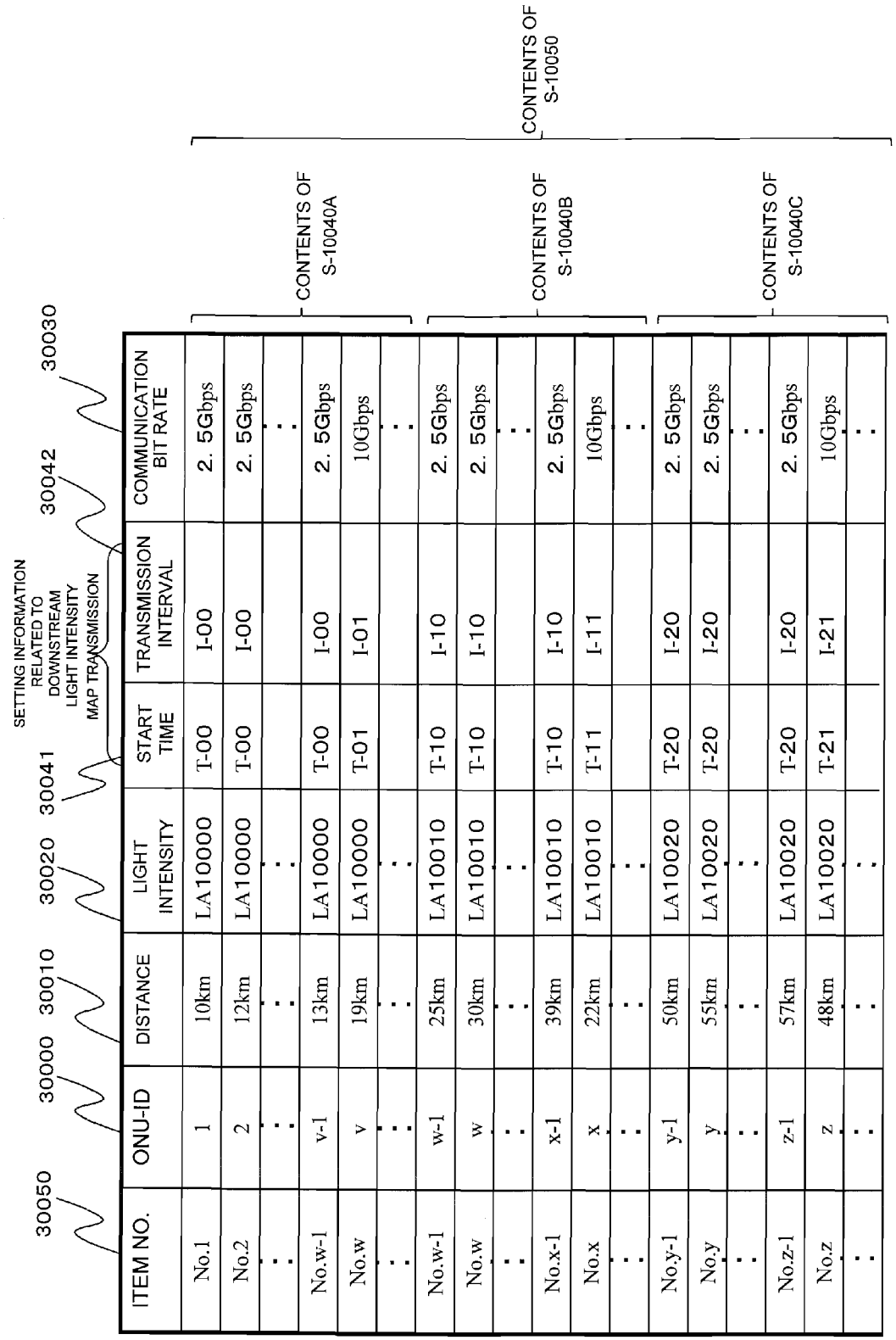
FIG. 11 is a table of ranging/DBA generated and held by the OLT.

Referring to FIG. 11, a description will be given of the light intensity correspondence table generated and held in the OLT 10 through the start-up processing of the ONU 20. FIG. 11 illustrates a light intensity correspondence table collecting the distance information on the respective ONUs from the OLT, which is created by the OLT 10 in Step 10050 (FIG. 9), and the light intensity necessary for communication. The light intensity correspondence table is held in the ranging/DBA information BD 1061 of the OLT 10.

The light intensity correspondence table includes an item No. 30050, an ONU-ID 30000, a distance 30010, a light intensity 30020, a start time 30041, a transmission interval 30042, and a communication bit rate 30030. A relationship between the ONU-ID 30000 which is the identifiers of the respective ONUs and the distance information 30010 to the subject ONU is shown in the light intensity correspondence table. This table information can be created every time the ranging conducted with the respective light intensities is completed. That is, the table information can be created by adding the information 30020 on the light intensity used in the communication between the OLT and the ONUs while the OLT 10 is processing the ONU-ID30000 and the distance information 30010 at the time of ranging (S-10040A, S-10040B, and S-10040C). Also, the table information is implemented every time the OLT 10 conducts the ranging processing with a change in the light intensity, and the table information is finally integrated together whereby the table information on all of the ONUs can be created (S-10050).

Also, when the above-described PON systems different in the communication bit rate are mixed together, the communication bit rate 30030 during the communication can be added at the time of creating the table with each light intensity.

It is understood from the light intensity correspondence table that to the ONU that has first conducted the ranging processing with the light intensity LA10000, can be transmitted the downstream frame with the light intensity LA10000 even in the future normal operation. It is also understood that to the ONU that has conducted the ranging processing with the light intensity increased up to LA10010, can be transmitted the downstream frame with the light intensity LA10010 even in the future normal operation. On the basis of the light intensity correspondence table, although will be described in detail later, the OLT 10 can determine the light intensity with which the destination ONU can correctly receive the frame with respect to the frame transferred from the IF1100 with the use of the table from the destination information. In transmission of the downstream frame with the above-mentioned light intensity with which the subject ONU can correctly receive the frame, when the ONU receives the signal other than the subject light intensity, the receiver within the ONU fails or are broken, or the ONU receives the signal as an error signal because the light intensity is too weak. The light intensity correspondence table can be used to create the light intensity map that can instruct such ONUs to block or discard the received signal during that time. Also, when the above-described PON systems different in the communication bit rate are mixed together, the reception instruction for each communication bit rate can be also added at the same time. The light intensity map will be described in detail later.

Referring to FIG. 12, a description will be given of the configuration of a downstream light intensity information table for generating a downstream light intensity map to be notified to the ONU in transmitting the downstream frame. The downstream light intensity information table is stored in the ranging/DBA information BD 1061. Referring to FIG. 12, the downstream light intensity information table includes an item No. 70030, an ONU-ID 70000, a Start 70030, an End 70040, a light intensity 70010, and a communication bit rate 70020.

As described in FIG. 3, the downstream frame processor 1210 changes the frame received from the access network 90 to a frame format for the PON interval 80 transmission. In this situation, the PON controller 1000 specifies the destination ONU from the header information on the frame received from the access network 90, and determines the light intensity with which the subject payload is to be transmitted with reference to a relationship between all of the ONUs 20 and the appropriate transmission light levels (database in FIG. 11) which is created at the time of ranging. Also, when there exist plural communication bit rates such that 10GPON and GPON are mixed together in the PON 40, communication bit rate information can be also referred to.

As described with reference to FIG. 3, when the downstream frame processor 1210 of the OLT 10 creates the downstream frame, the PON controller 1000 determines the configuration of the payload part of the downstream frame (that is, the downstream signal transmission bandwidth addressed to each ONU is assigned). The PON controller 1000 checks the bandwidth information against the light intensity correspondence table illustrated in FIG. 1 to generate the downstream light intensity information table illustrated in FIG. 12. The configuration of FIG. 12 collects an ONU reception start time 70030, an ONU reception end time 70040, and a light transmission level 70010 at an absolute time for each of the downstream light intensity map destination ONUs in a table. The downstream light intensity information table associates the transmission timing (time) of the downstream signal with the light intensity of the signal, and from the table, a start time and a duration time related to the signal transmitted with each light intensity are found. This is notified to the ONU in advance whereby the time when the signal can be received at the ONU side and the duration time can be recognized. When there exists plural communication bit rates where 10GPON and GPON are mixed together in the PON system 40, the communication bit rate information is added (70020).

The downstream light intensity information table is loaded in a header of the downstream frame, or referred to in generating the downstream light intensity map to be notified to the ONU as a single frame. A specific transmitting method and signal configuration example will be described later.

Figure 13:
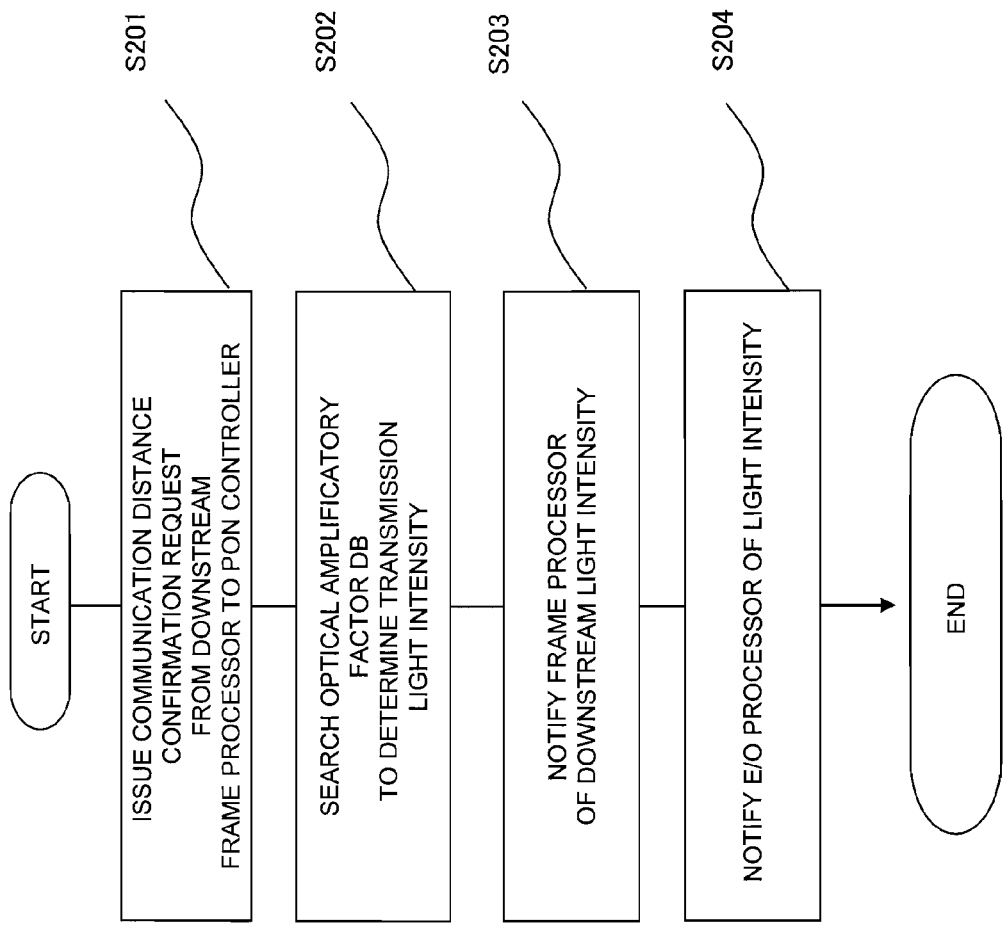
FIG. 13 is a flowchart illustrating processing in a light controller of the OLT.

Referring to FIG. 13, a description will be given of a procedure of the processing in the OLT 10 when transmitting a downstream frame (frame in which a downstream signal transmission schedule is stored in the header part), or a downstream signal transmission schedule notice frame.

The downstream frame processor 1210 of the OLT 10 searches the downstream path information DB 1211 provided in the downstream frame processor 1210 of the OLT 10 with the header information extracted from the downstream frame received by the IF1100 as a search key. The downstream frame processor 1210 inquires about a transmission light intensity on the basis of the Port-ID information assigned to the GEM frame, which is obtained at this stage. Alternatively, the light controller 1090 searches a transmission distance (or ONU group identification information to which the ONU belongs to) to the ONU 20 according to the ranging/DBA information BD 1061, and searches the optical amplification factor information DB on the basis of the results. The latter case will be described with reference to FIG. 13.

Referring to FIG. 13, the downstream frame processor 1210 requests the light controller 1090 to determine to which of the ONU groups illustrated in FIG. 1 the ONU 20 that is a destination of the downstream signal belongs (S201). Referring to the optical amplification factor DB1091 predetermined based on ranging/DBA information DB1061, the light controller 1090 receives the control signal, specifies the ONU group to which the ONU 20 belongs, and determines a signal intensity (amplification factor) when the downstream frame processor 1210 transmits the signal to the ONU 20 (S202). In this situation, if the ONU-ID corresponding to the Port-ID is identical (or the ONU group is identical), the optical amplification factor becomes also the same value. In order to obtain information related to the optical amplification factor, in this embodiment, in the optical amplification factor information DB 1091 are stored the above-mentioned table information of FIGS. 11 and 12 which is developed from the ranging/DBA information BD 1061, and information obtained by processing a part of the table information.

After the signal intensity addressed to the ONU 20 has been determined, the light controller 1090 notifies the downstream frame processor 1210 of the intensity information (S203). Also, at the same time, the light controller 1090 notifies the O/E processor 1310 of the light intensity information when transmitting the downstream frame (GEM frame) including the Port-ID (S204), and completes the processing. In Step 203, the light intensity map is generated and inserted in the downstream frame header. Step 204 is conducted for the optical module control when transmitting the downstream frame really. The light function adjustment is conducted by the intensity controller 11000 of the O/E processor 1310.

The method of adjusting the light intensity according to an instruction from the light controller 1090 is described in the above flow. Apart from the above method, the light intensity adjustment can be also realized by a method of controlling the intensity on the basis of light intensity information 5161, 5171, and 5181 (FIG. 15) with reference to the downstream frame header received from the downstream frame processor 1210. The light intensity adjustment can be also realized by a configuration in which there is applied a unit that collects the intensity information with reference to the optical amplification factor information DB 1091 from the light controller 1090 upon receiving a request from the intensity controller 11000 when the light intensity information 5161 to 5181 is not included in the downstream frame.

On the basis of the transmission intensity information obtained in Step 203, the downstream frame processor 1210 generates the downstream light intensity map that is inserted in the downstream frame header, and completes the downstream frame configuration processing to be transmitted to the PON interval 80. The frame thus configured is illustrated in FIG. 15.

Referring to FIG. 14, a description will be given of a configuration of the optical amplification factor information database 1091 held in the light controller of the OLT 10. The optical amplification factor information DB 1091 is used for determining the transmission intensity (light intensity/amplification factor 10912) from the Port-ID of the subject frame in Step 202 of FIG. 10.

The optical amplification factor information DB 1091 is used to manage the light intensity of the transmitting signal to the ONU 20 which is a destination of the downstream frame. In FIG. 14A, the optical amplification factor information DB 1091 includes a Port-ID 10911, alight intensity/amplification factor 10912, a Valid 10913, an ONU group 10914, and the other flag 10915. Also, in FIG. 14B, a light amplification factor DB 1091A includes the Port-ID 10911, the light intensity/amplification factor 10912, the Valid 10913, the ONU group 10914, and the other flag 10915.

The optical amplification factor DB 1091 uses the Port-ID 10911 as an identifier of the ONU 20 as a management ID. The Port-ID is a destination identifier in which the Port-ID is included in the downstream frame (GEM frame), and available. As the other configuration method, the identifiers used in the existing PON such as ONU-ID or SN (serial number) may be used.

Further, the optical amplification factor information DB 1091 includes the light intensity/amplification factor field 10912 as a parameter indicative of the downstream light signal transmission intensity for each ONU 20. FIG. 14A illustrates a state in which the light intensity is stored. In FIG. 14B, a variable indicative of a relative amplification/attenuation rate is used on the basis of a default transmission intensity (initial setting intensity predetermined at the time of manufacturing and shipping an optical module) of the optical module.

The states of the respective ONUs 20 are managed by the Valid 10913 indicative of whether the respective table entries are valid or invalid, and the other flag 10915. The method of managing the state of the ONUs 20 in the OLT 10 can employ a large number of units depending on the installation of each vender. The Valid 10913 is used when generating the failure or abnormality signal, and information (state No.) indicative of the state of the ONU 20 is all represented by using several bits ensured in the other flag 10915, including information indicative of whether the ONU 20 is turned on, or not. Also, as another method, the Valid 10913 is used as a valid value at the time of turning on the ONU 20, and the subsequent information related to the start-up, operation, maintenance, and management of the ONU 20 can be managed with several bits of the other flag 10915.

Further, the optical amplification factor information DB 1091 stores the ONU group 10914 to which each destination ONU belongs for each Port-ID 10911 in advance. The absolute and relative light intensities 10912 and 10916 are determined according to a difference in the ONU groups. Accordingly, when an operator installs the ONU 20, the ONU group 10914 is decided, and at the same time, an estimate value of the light intensity/amplification factor 10912 is determined.

Even if the ONU group to which the ONU 20 belongs is the same, the light intensity required for communication may be different. That is, this is a case in which the communication speed (bit rate) is different for each ONU. When the communication bit rate is changed from 2.5 Gbit/s to 10 Gbit/s, an influence of the wavelength dispersion is about 16 times, and the S/N ratio is about four times. As a result, the transmission distance is remarkably reduced. Accordingly, in order to generate the optical amplification factor information DB 1091, the light intensity/amplification factor 10912 is determined taking the distance to the ONU group and an influence of the communication bit rate on the light characteristic into account.

Referring to FIG. 15, a description will be given of a downstream light intensity map transmitting method for realizing the downstream signal transmission and reception with variable intensity. The light intensity map transmitted from the OLT 10 to the ONU 20 is transmitted as the header information of the PON, or transmitted as a single frame (notice frame only for downstream light intensity map). In FIG. 15, it is assumed that the method is applied to the GPON, and the method will be described as the former basic signal configuration.

In order to avoid the failure of the light receiving device, also in order to avoid the unnecessary error message issuance from the ONU that is no signal receiving object, the downstream light intensity map to be notified to the respective ONUs 20 from the OLT 10 is information which all of the ONUs 20 have to know before receiving a downstream main signal. More specifically, there is a need for the ONU group 20A to grasp the transmission timing of the downstream signal data transmitted toward the ONU group 20C. Conversely, the ONU group 20C also needs to grasp the transmission timing of the downstream signal transmitted toward the ONU group 20A by the downstream light intensity map (reception start/end time of each existing preliminary intensity included in a downstream signal transmission schedule 5150). That is, there is a need to design the header information (downstream light intensity map) of the downstream frame so that all of the ONUs 20 can grasp the contents thereof.

Referring to FIG. 15A, a description will be given of a frame signal addressed to each ONU from the OLT in the GPON. Referring to FIG. 15A, the frame signal includes a head frame synchronization pattern 90000, a PLOAM field 5130, a ground indication region 90010, and a payload 5120. The frame synchronization pattern 90000 is a region for the ONU to identify a head of the frame. The PLOAM field 5130 transmits information of monitoring, maintenance, and control. The ground indication region 90010 indicates the signal transmission timing of each ONU. The frame synchronization pattern 90000, the PLOAM field 5130, and the ground indication region 90010 configure a header part of the frame. The payload 5120 is a time division multiplexed data part addressed to each ONU.

In FIG. 15A, there is used a physical layer operation, administration and management (PLOAM) field that is a control message region included in the header information on the downstream signal as disclosed in the document "ITU-T Recommendation G.984.3". In FIG. 15B, the PLOAM field 5130 includes an ONU-ID 7001, a control frame identifier 5131, a message field 5132, and a cyclic redundancy check (CRC) 7002.

The control frame identifier 5131 includes an identifier (a free ID available uniquely to a vender may be used. In this example, "11000000") indicating that the PLOAM message is a uniquely stipulated message including "light intensity information". The message field 5132 in PLOAM inserts the downstream signal transmission schedule 5150 until the downstream frame to be received by the ONU 20 is arrival at a time when the head of the downstream frame header is received (FIG. 15, a head time of 90000). The downstream signal transmission schedule 5150 includes light intensity information 5151-11, and a payload start time 5151-12 and an end time 5151-13 of the downstream signal, for each signal different in the destination, on the basis of the designation for each destination ONU. The payload start time 5151-12 and the end time 5151-13 of the downstream signal may be configured by the payload start time and a data length. The light intensity map can include one or plural instructions per PLOAM field (5150-1 to 5150-K).

Referring to FIGS. 15C-A, 15C-B, and 15C-C, a description will be given of the configuration of the respective light intensity information notice signals for the ONUs 20A-R, 20B-R, and 20C-R. Referring to FIG. 15C-A, the ONU 20A-R starts to receive a signal of the light intensity information 5161 at a signal reception start time 5162, and completes the reception at a reception end time 5163. The ONU 20A-R discards, ignores, or blocks signals received after then. The same configuration is applied to the light intensity map notified to the ONU 20B-R in FIG. 15C-B, and to the light intensity map notified to the ONU 20C-R in FIG. 15C-C. The respective intensity maps include light intensity information 5171, 5181, reception start times 5172, 5182, and reception completion times 5173, 5183. The operation in the ONUs 20B-R and 20C-R that receive the above information is also identical with the operation of the ONU 20A-R.

The light intensity information 5161, 5171, and 5181 included in this example can be omitted. The OLT 10 grasps appropriate light intensity to be applied when transmitting data to the ONU 20 that is a destination of the downstream signal, and the ONU 20 side needs only to know the timing at which the subject ONU is to receive the signal.

Also, at the signal reception start time 5152-12 and the reception end time 5153-13 for the respective ONUs described above is stored time information (in this embodiment, information defined as "absolute time") shared by the OLT and the ONU which will be described later.). That is, the OLT and the respective ONUs 20 implement various processing such as the frame end processing, the ONU start-up, and the communication status monitoring with the use of the common time information. As another unit, there is a method in which the OLT and the ONUs share only the time (timing) that is a base of the respective operation by the above-described absolute time. When this method is applied, in the processing requiring the subsequent time information, the same processing can be conducted by giving relative time information from the above-mentioned "reference time".

FIG. 15 illustrates a signal configuration example indicating the light intensity map for each ONU. Alternatively, there can be applied a method in which a group including the ONUs having the same light intensity is defined (FIGS. 1 and 14), and the light intensity is designated for each of the ONU groups 20A to 20C (FIGS. 1 and 14). Those variations will be described in detail after the basic embodiment is described (refer to FIG. 17 and the subsequent figures).

Figure 16:
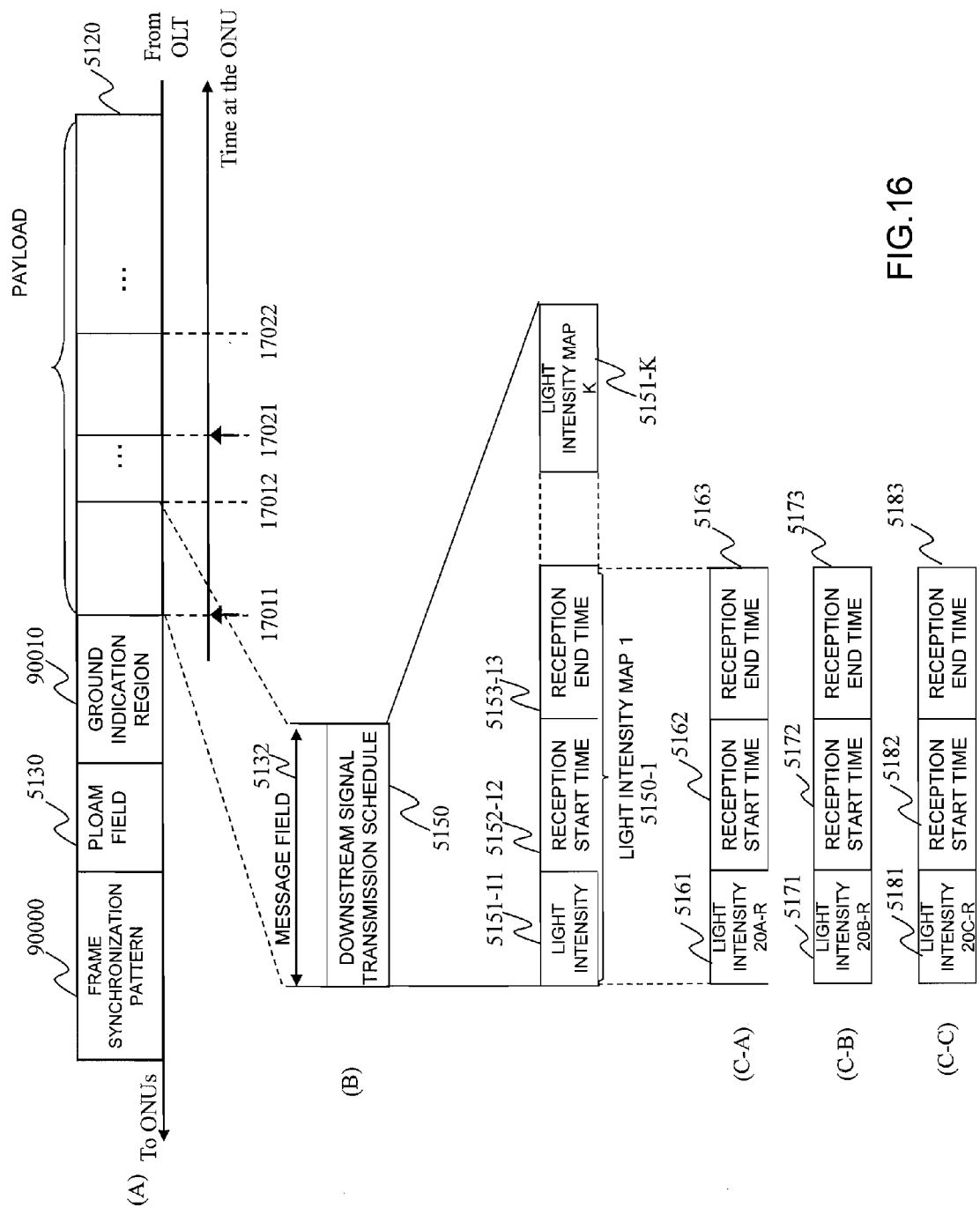
FIGS. 16A to 16C-C are diagrams illustrating a frame format of another downstream signal.

Referring to FIG. 16, a description will be given of the configuration of the downstream light intensity map for notifying the plural ONUs or the ONU group of the downstream signal transmission schedule at the same time. Referring to FIG. 16, the light intensity map is loaded on the downstream frame of the PON as the payload information. This is because when the downstream light intensity map is generated for the plural ONUs or the ONU group in the signal configuration of FIG. 15, there is a possibility that the downstream light intensity map exceeds a field length of the PLOAM field, and the configuration is a another solution for normally transmitting and receiving the signal as the normal PON frame.

A difference from FIG. 15 resides in only a difference in the field in which the downstream light intensity map is stored, the respective field information is identical with that in FIG. 15, and therefore its description will be omitted. The reception start times 17011 and 17021 of the respective downstream light intensity maps are notified at the time of starting up the ONU 20. Also, the end time of the downstream intensity map can be recognized by setting the field length included in the intensity map to a fixed length, and setting the fixed length in the ONU 20 in advance.

Figure 17:
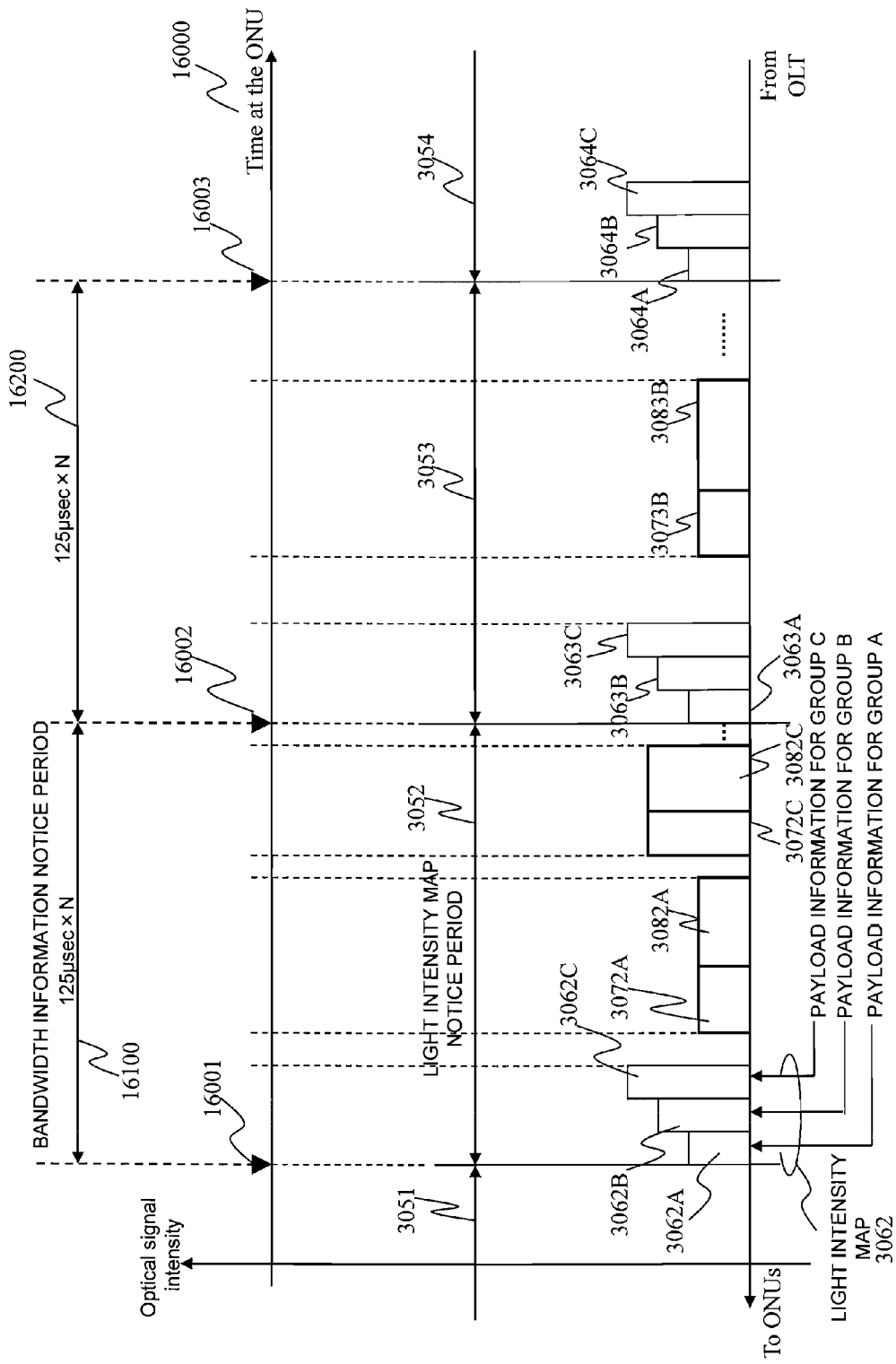
FIG. 17 is a configuration diagram of a downstream signal illustrating a downstream signal transmitting method using a light intensity map.

Referring to FIG. 17, a description will be given of a downstream signal transmitting method using the downstream light intensity map of FIG. 15. FIG. 17 illustrates a method of giving notice of the downstream light intensity maps with respect to all of the ONU groups (20A to 20C) at regular intervals and as a bundle.

Referring to FIG. 17, a time axis 16000 is a time on the ONU 20. The reception times 16001, 16002, and 16003 on the axis are times at which the downstream light intensity map starts to be transmitted. As illustrated in FIGS. 7 to 9, the transmission time intervals (and time at which the intensity map is first received) is notified by the OLT 10 at the time of starting up the ONU 20. In this example, taking that the downstream signal configuration of the GPON standards is 125 microseconds unit into consideration, the transmission time interval is set to integer times (N is a natural number in the figure) of 125 microseconds. The downstream light intensity map conforms to the disclosure of the GPON standards (ITU-T Recommendation G.984.3), and a fixed pattern for conducting the frame synchronizing processing is included in the head of the downstream signal for each 125 microseconds. Therefore, in order to most effectively use the downstream communication bandwidth, there is a method of transmitting the light intensity maps (three in this embodiment) corresponding to the number of ONU groups as the downstream intensity map transmitted at the time 16001 to 16003 (refer to FIG. 19). That is, in the downstream light intensity map configuration of FIG. 15 or 16, the reception start time 5152-12 and the reception end time 5153-13 for three groups are included in the downstream signal transmission schedule 5150 for transmission.

There is a case in which the downstream signal of the same light intensity is transmitted by plural times within time frames of the downstream light intensity map transmission intervals 16100 and 16200. For example, this is a case in which within the time frame 16100, after a signal is transmitted to the ONUs 20 of the ONU group 20A after the downstream light intensity map is transmitted, a signal addressed to the ONUs 20 of the ONU group 20C is transmitted, and the signal addressed to the ONUs 20 (another/or again the same ONUs 20) of the ONU group 20A is again transmitted. In this case, in the downstream light intensity map of FIG. 15, three parameters of the light intensity identifier 5151-11, the reception start time 5152-12, and the reception end time 5153-13 are regarded as one set to generate the downstream signal transmission schedule 5150 including plural sets (because information for identifying the light intensity is necessary). Also, FIG. 17 illustrates a configuration of giving the downstream light intensity map at the beginning of the bandwidth information notice period, and one or plural data frames are included in the payload part of the downstream light intensity map frame (FIG. 15) in the form of the GEM frame according to the GPON standards. FIG. 17 illustrates two frames as the configuration of the GEM frame, and the GEM frame for the ONU group 20A is configured by a GEM header 3072A and a GEM payload 3082A. Likewise, the GEM frame for the ONU group 20C is configured by a GEM header 3072C and a GEM payload 3082C. Likewise, the GEM frame (header part 3073B and payload part 3083B) of the bandwidth information notice period 16200 is included in the downstream PON frame starting from the downstream light intensity map 3063.

FIG. 17 illustrates the configuration in which the time frames 16100 and 16200 go across the plural PON basic frames. In the PON, as described above, the frame synchronization processing is conducted every 125 microseconds, and as illustrated in FIGS. 15A and 16A, the downstream frame header is inserted therein. However, there is no need to insert the downstream light intensity map in the downstream PON frame transmitted at a middle time (for example, between the times 16001 and 16002) of the bandwidth information notice period.

Figure 18:
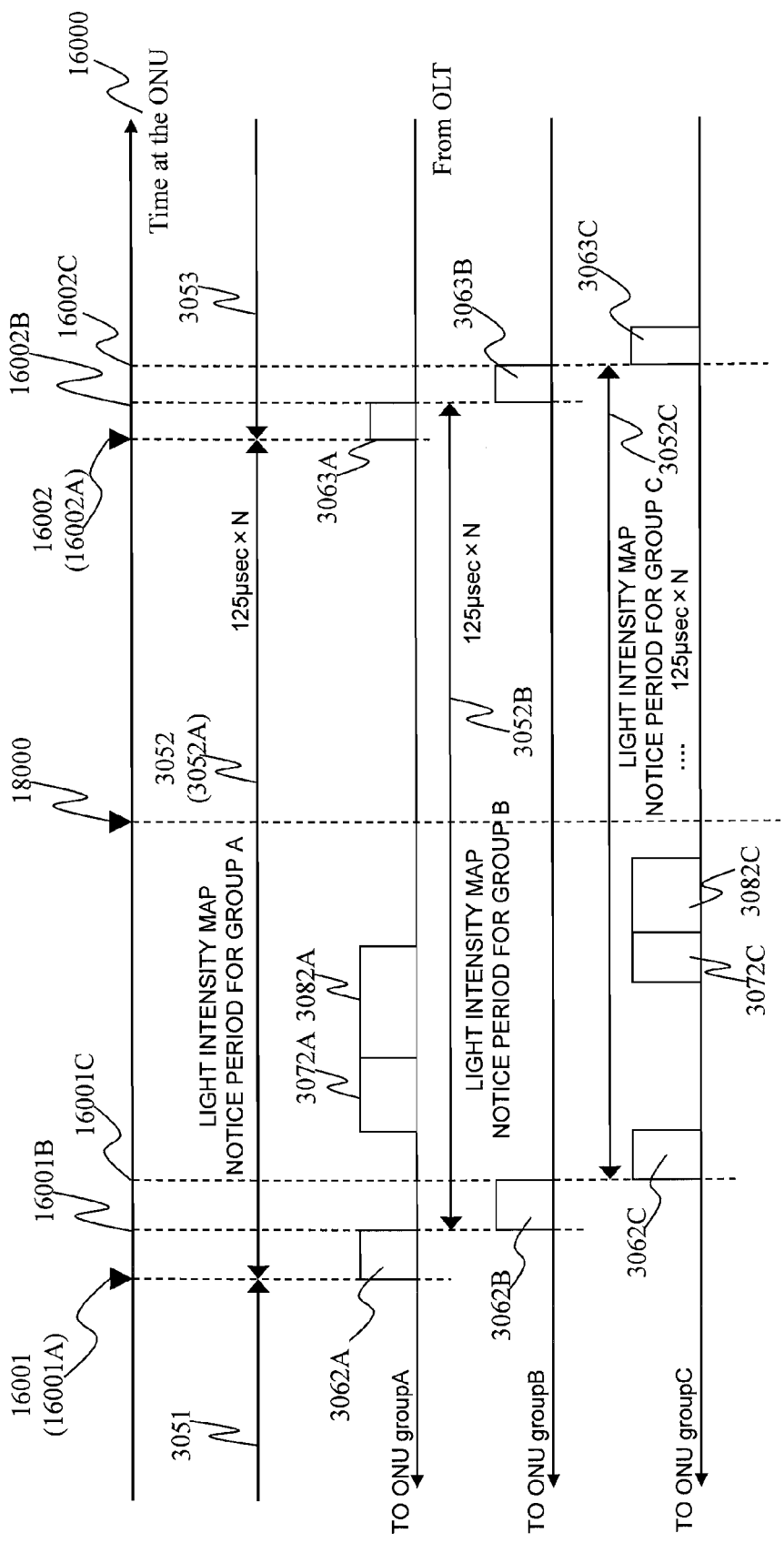
FIG. 18 is a configuration diagram of a downstream signal in which the downstream signal is divided for each destination ONU group shown in FIG. 17.

Referring to FIG. 18, a description will be given of a time multiplexing state for each ONU group in which the signal configuration diagram of FIG. 17 is divided for each destination ONU group. FIG. 18 illustrates an enlargement of the signal transmission status from the time 16001 to the time 16002 in FIG. 17.

FIG. 18 illustrates a case in which the downstream signal (downstream light intensity map) reception time is different for each destination ONU or ONU group. FIG. 18 illustrates a case in which the downstream signal reception time is different for each destination ONU group. The operation principle is the same even though the difference in each ONU group is replaced with the difference for each ONU.

In FIGS. 17 and 18, it is assumed that the light intensity maps are transmitted in the increasing order of the light intensity. The reception start time of the ONU group 20A is the 16001 (in this example, the time is represented by 16001A for discriminating the ONU group 20A from other ONU groups). Likewise, in the ONU group 20B and the ONU group 20C, the times 16001B and 16001C are the reception start times. As illustrated in FIG. 17, the downstream light intensity map notice intervals to all of the ONU groups are equal to each other. The times at which the ONU groups 20A, 20B, and 20C subsequently receive the downstream light intensity maps are times 16002A, 16002B, and 16002C, respectively. The transmission timings of the respective downstream light intensity maps are adjusted at the OLT side so that the downstream light intensity maps are not mixed together through the time division multiplexing system.

In order that overheads 3062A to 3062C and 3063A to 3063C integrating the frame synchronization pattern 90000, the PLOAM field (including the light intensity map) 5130, and the ground indication region 90010 together are correctively received without damaging the optical receiver of the ONU 20, the frame lengths are fixed. When the downstream data frames are transmitted by plural times as illustrated in FIG. 17, the amount of information of the downstream light intensity map is increased, and in the reverse situation, the amount of information is decreased. In this case, the frame length is fixed, and the necessary information is loaded, (1) a surplus length is padded, and (2) when the fixed length is short to the amount of information, adjustment is conducted within the OLT 10 so that indescribable information is notified by the subsequent downstream light intensity map. The signal configuration for always making the frame length of the downstream intensity map fixed will be described later with reference to FIG. 19.

As illustrated in FIG. 17, in the GPON standards (ITU-T Recommendation G.984.3), the fixed pattern for conducting the frame synchronization processing is included in the head of the downstream signal for each 125 microseconds. Therefore, the light intensity maps (three in this embodiment) corresponding to the number of ONU groups are transmitted to the downstream light intensity maps 3062A to 3062C and 3063A to 3063C of FIG. 18. That is, the PON frame starting from the time 16001A is regarded as the basic frame of 125 microseconds in the ONU group 20A. In the ONU group 20B and the ONU group 20C, it appears that the PON basic frames start from the respective times 16001B and 16001C. Further, in each ONU, there is a need to know the downstream light signal transmission schedule of the ONUs or the ONU groups other than the subject ONU or the ONU group to which the subject ONU belongs in advance. Therefore, the same downstream signal transmission schedule is described in the respective overheads 3062A to 3062C. The same is applied to the overheads 2063A to 30633C. The respective PON frame boundary times 16001A to 16001C are determined according to the downstream signal reception start time notified at the time of starting up each ONU group.

In setting the frame length of the downstream light intensity map, the frame length may be set within the device in advance apart from the start-up processing, or the OLT 10 may notify the ONU 20 of the frame length according to the determination (the number of ONUs or the number of ONU groups) in the OLT 10 during the start-up processing. In the latter case, similarly to the downstream light intensity map reception start time and the reception interval notice in FIGS. 7 to 9, there is a method of notifying the ONU 20 of the downstream light intensity map length. For example, the method can be realized by conducting the downstream light intensity map length notice subsequently to the reception interval notices 20042A, 20042B, and 20042C.

Figure 19:
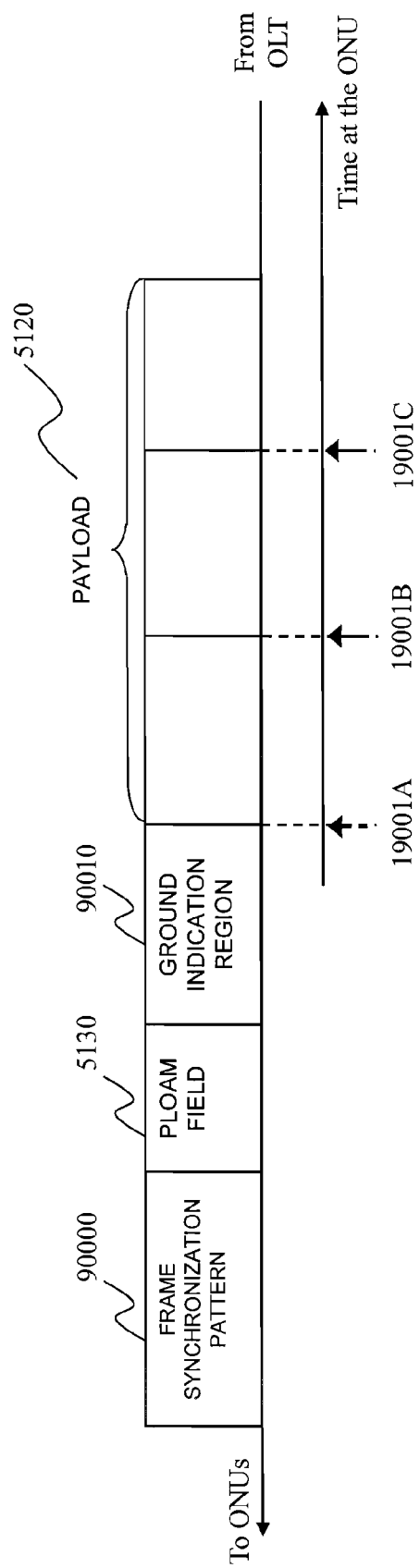
FIG. 19 is a configuration diagram of a signal illustrating a map configuration when a downstream light intensity map of FIG. 16 is set as a fixed length.

In FIG. 17, the downstream signal transmitted from the OLT 10 after the time 18000 of FIG. 18 is omitted. However, as illustrated in FIG. 18, if the amount of data can be transmitted in the time division multiplexing within the time width of the subsequent downstream light intensity map reception times 16002A to 16002C, the downstream signal can be transmitted. This frame transmission schedule occurs depending on change of the amount of data received from the access network 90 by the OLT 10, or of the destination. In this situation, as described above, there is a possibility that plural downstream frames is transmitted in each of periods 3052A to 3052C to the same ONU or the same ONU group. Referring to FIG. 19, a description will be given of a map configuration when the downstream light intensity map of FIG. 16 has a fixed length. In FIG. 19, the OLT 10 inserts a downstream signal transmission schedule on the ONU group 20A from a time 19001A to a time 19001B, a downstream signal transmission schedule on the ONU group 20B from the time 19001B to a time 19001C, and a downstream signal transmission schedule on the ONU group 20C from the time 19001C to a last of this frame. The detailed description of the downstream signal transmission schedule is identical with that in FIG. 16, and therefore will be omitted.

Figure 20:
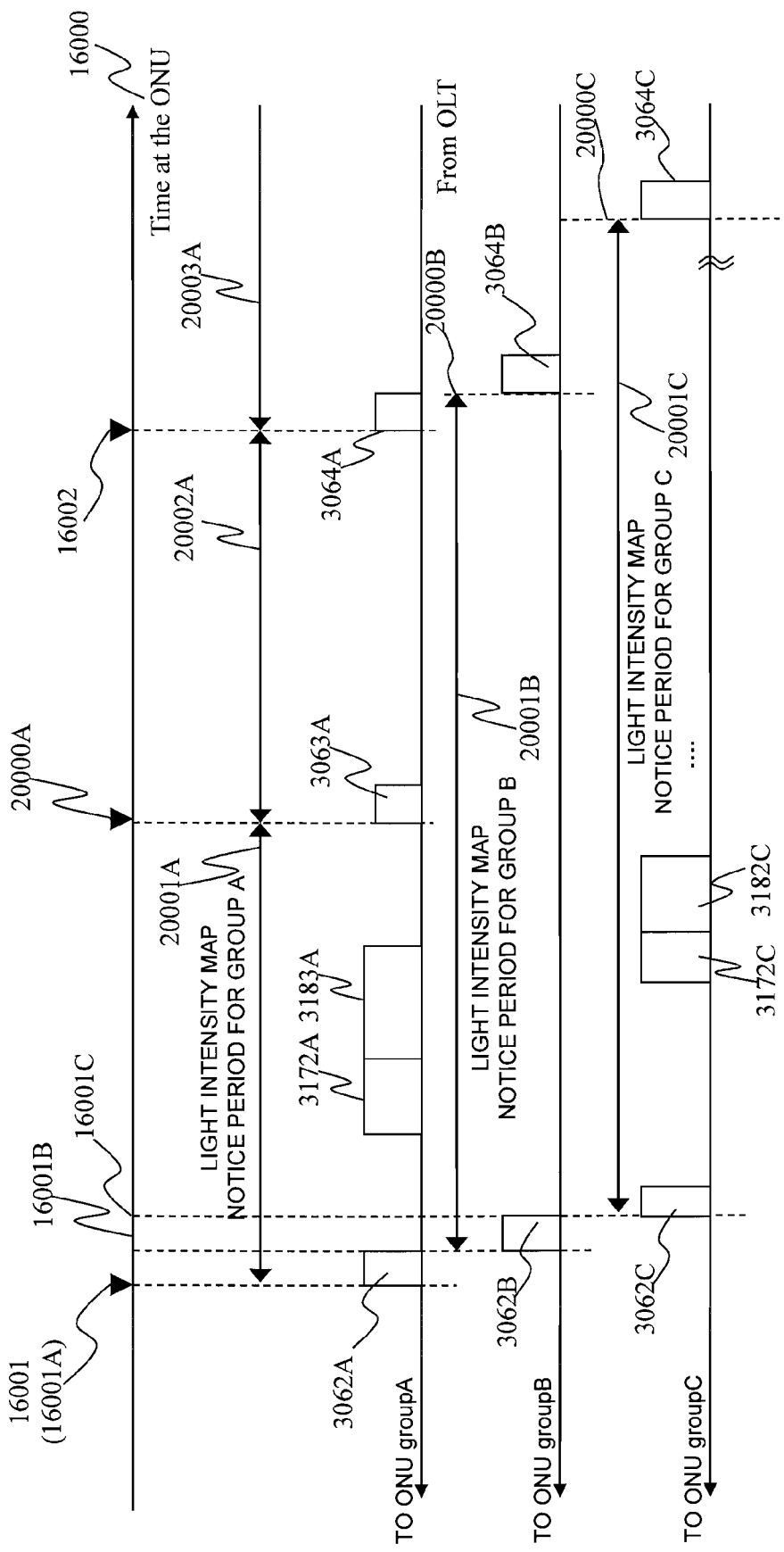
FIG. 20 is a configuration diagram of a signal illustrating a layout of a downstream signal when a downstream light intensity transmission period is changed for each ONU or each ONU group.

Referring to FIG. 20, a description will be given of a case in which the downstream light intensity transmission period is changed for each ONU or each ONU group. In FIG. 18, the same period is used for all of the ONUs. On the contrary, in FIG. 20, the downstream light intensity transmission period is changed according to each ONU or each ONU group.

Referring to FIG. 20, the downstream signal transmission schedule transmission period set in the ONU group 20A is a time interval 20001A from the time 16001A to the time 20000A. Likewise, the downstream signal transmission schedule transmission period set in the ONU group 20B is a time interval 20001B from the time 16001B to the time 20000B. Further, a set value for the ONU group 20C is a time interval 20001C from the time 16001C to the time 200000. The time intervals 20001A, the time intervals 20001B, and the time intervals 20001C are different from each other, and satisfy a relationship of the time intervals 20001A<the time intervals 20001B<the time intervals 20001C.

In FIG. 20, like FIGS. 17 and 18, in setting of the downstream signal transmission schedule transmission period, a basic frame period of 125 microseconds is set as a unit. For that reason, when the period is changed in each ONU or each ONU group as illustrated in FIG. 20, in the ONU or the ONU group having a long period set, there is a need to consider the number of short periods set in another ONU or ONU group, which are included in the period in the OLT 10. That is, the available bandwidth (in the ONU having the long period set) is decreased by a frame length of the downstream signal transmission schedule frame. Also, in the notice of the downstream signal transmission schedule frame to the ONU of the short period, there is a necessary for the OLT 10 to grasp the downstream bandwidth assignment status for the time width notified to the ONU having the short period set, among the downstream signal transmission schedule to the ONU having the longest period set. More specifically, when the downstream signal transmission schedule frame (3062A) is transmitted to the ONU group 20A, the signal transmission schedule for the ONU group 20B from the time 16001B to the time 20000A, and the downstream signal bandwidth assignment transmitted to the ONU group 20C from the time 16001C to the time 20000A are grasped in advance. That is, in transmission of the downstream light intensity map 3062A, there is a need to include (a part of) the downstream signal transmission schedule 3062C in the ONU group 20C having the longest period set. That is, in the OLT 10, there is required that the downstream signal transmission schedule for the ONU group 20C has been set at that time.

As the number of times of transmitting the downstream signal transmission schedule frame is smaller, the bandwidth use efficiency of the downstream signal is more improved. On the other hand, with the use of the long period setting, a sufficient buffer is required within the OLT 10, and a time for holding the transmission schedule within the OLT 10 is also lengthened. A case in which the efficiency is increased with the shorter period is that large-volume data is frequently transmitted or received. There arise severe problems that although the data cannot be accumulated in the OLT 10 for a long time, it is difficult to provide a sufficient buffer for the reason that cost reduction in the ONU 20 is important.

Figure 21:
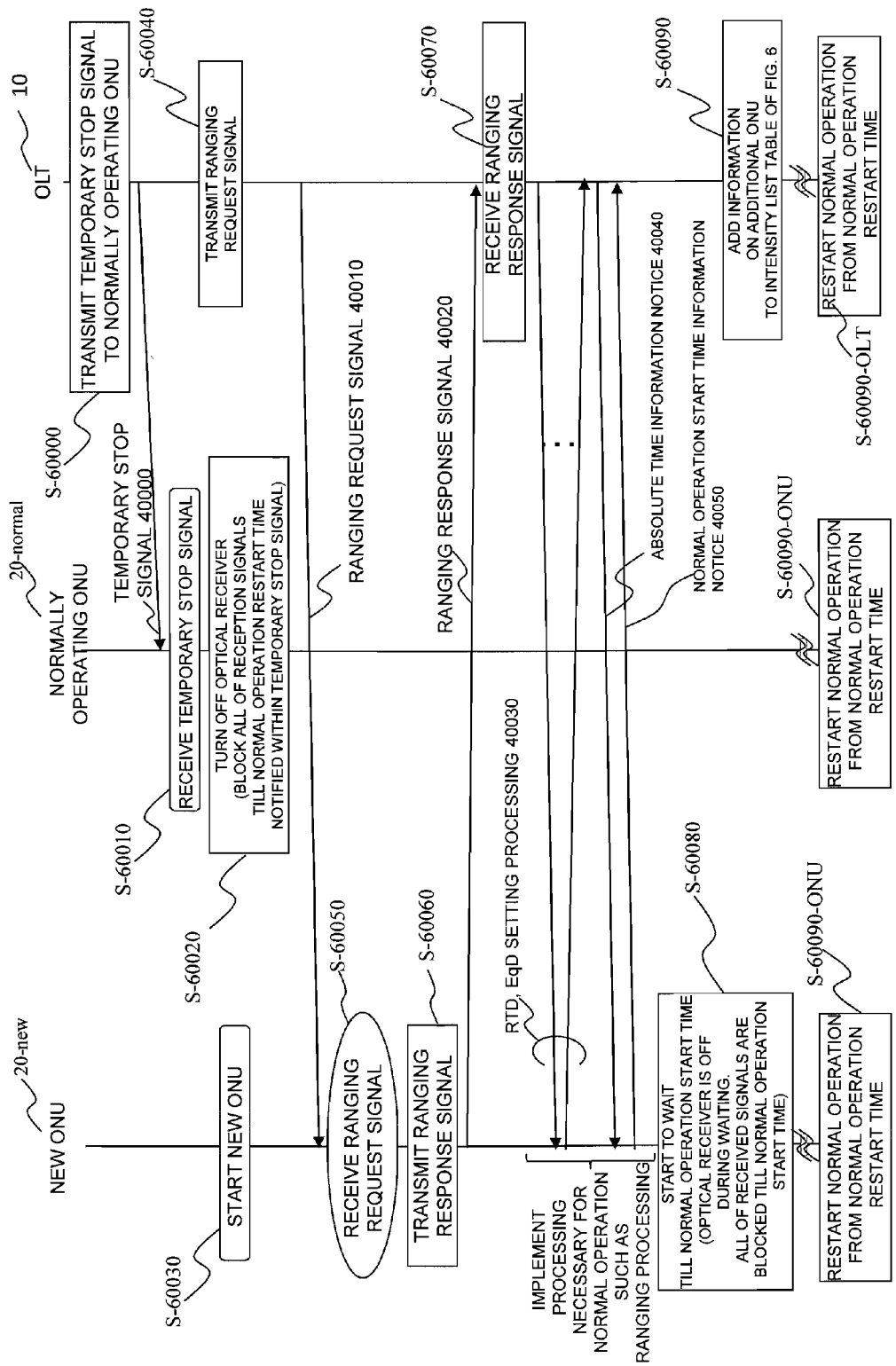
FIG. 21 is a sequence diagram illustrating a procedure of registering a new ONU in a normally operating PON system.

Subsequently, referring to FIG. 21, a description will be given of a procedure of registering a new ONU in a PON system 1 that is in the normal operation. In this example, it is assumed that all of the ONUs during the normal operation is ONU 20-normal, and the ONU newly registered is ONU20-new. First, a temporary stop signal 40000 for giving notice of temporary stop of the normal operation is transmitted from the OLT 10 to the ONU 20-nomral (S-60000). The ONU 20-normal that has received the temporary stop signal 40000 reads the normal operation restart time within the signal, and controls the O/E processor 2310 so as to block all of the received signals till the normal operation restart time (S-60010, S-60020). The reception of this signal can prevent an error reception, and the damage or failure of the optical receiver due to a difference in the light intensity, which may occur in the processing before the normal operation such as the ranging processing conducted on the ONU 20-new after this. Also, the upstream signal such as the ranging response signal 20020 transmitted subsequently by the ONU 20-new can be also prevented from colliding with the upstream signal during the normal operation, which is transmitted by the ONU 20-normal. The temporary stop signal 40000 can be notified by assigning the normal operation restart time to the light intensity maps 5150-1 to 5150-K within the normal downstream frame as the subsequent reception start time information.

After transmission of the temporary stop signal 40000, an installation contractor or a user who has notified of that start-up is enabled starts the ONU 20-new (S-60030). Thereafter, the OLT 10 transmits the ranging request signal 40010 to the ONU 20-new while adjusting the light intensity or the communication bit rate as with the start-up of FIGS. 7 to 9, and waits for the ranging response signal 40020 from the ONU 20-new (S-60040). In this situation, if an installation place, the distance information on the subject ONU, or the communication bit rate is grasped in advance, the operator may instruct the OLT 10 to transmit the ranging request signal 40010 to designate the light intensity and the communication bit rate. The ONU 20-new (S-60050) that has received the ranging request signal 40010 transmits the ranging response signal 40020 to the OLT 10 (S-60060). The OLT 10 (S-60070) that has received the ranging response signal 40020 conducts the processing (40030, 40040, 40050) till the normal operation described with reference to FIGS. 7 to 9 in association with the ONU 20-new with the light intensity and the communication bit rate of the transmitted ranging request signal 40010. Thereafter, the ONU 20-new controls the O/E processor 2310 so as to block all of the received signals till the normal operation restart time, and waits (S-60080). In this situation, the processing contents is same as the contents described with reference to FIGS. 7 to 9, and therefore will be omitted. In this situation, the information on the ONU 20-new is added to the table information illustrated in FIG. 12, and used for subsequent creation of the downstream frame or the light intensity map (S-60090).

When coming to the normal operation restart time, the OLT 10, the ONU 20-normal, and the ONU 20-new thereafter restart the normal operation (S-60100-OLT, S-60100-ONU).

Figure 22:
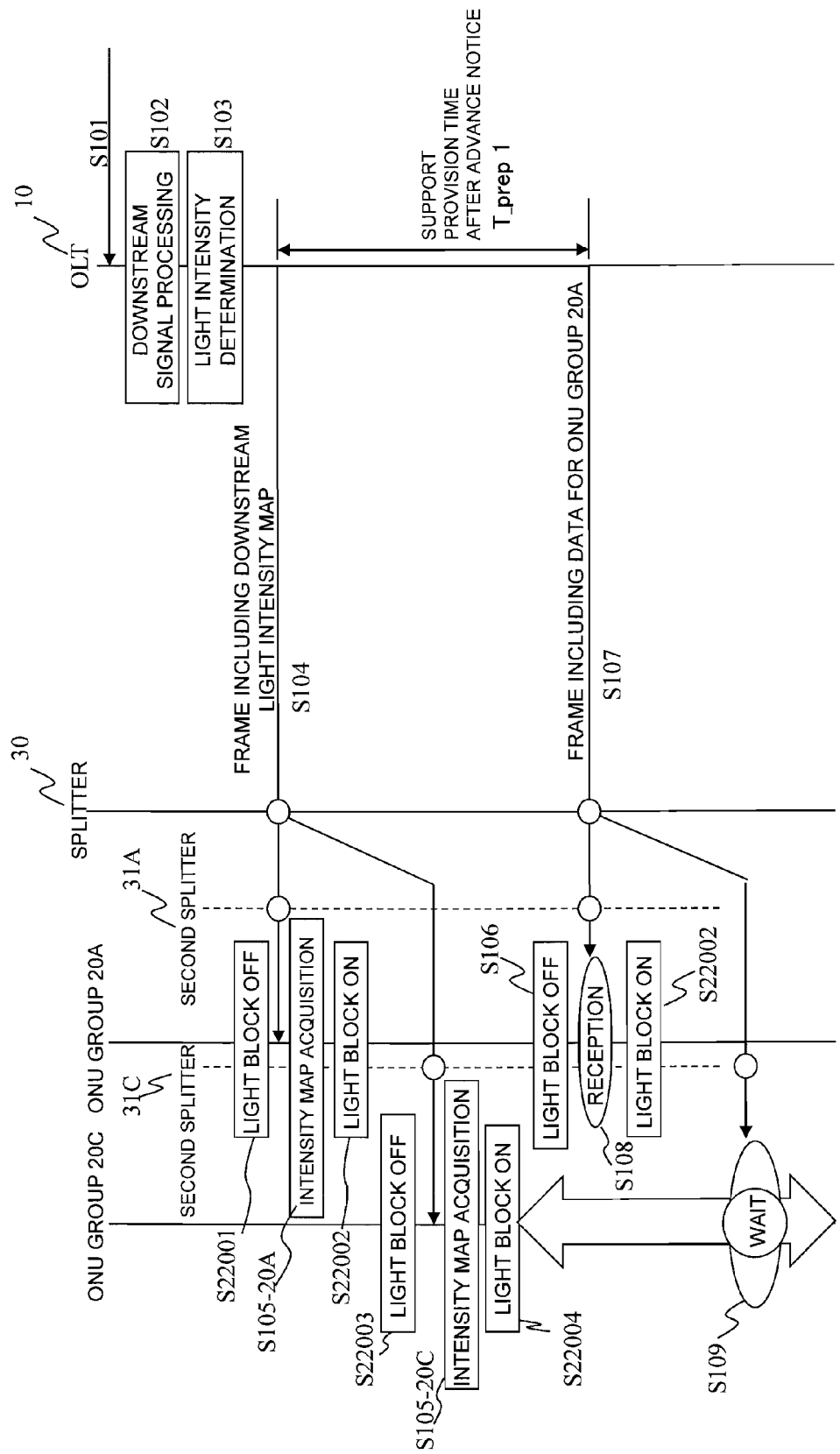
FIG. 22 is a sequence diagram illustrating a procedure of transmitting a downstream frame.

Referring to FIG. 22, a description will be given of a procedure of the downstream frame transmission in the optical access system. FIG. 22 illustrates a processing procedure of the downstream frame transmitted to the ONU group 20A and the ONU group 20C from the OLT 10.

Referring to FIG. 22, when the OLT 10 receives the downstream signal from the SNI IF 1100 (S101), or when there is the PON control signal (corresponding to the PLOAM signal (PLOAM field) in the GPON) to be transmitted toward the ONU 20, the OLT 10 generates and transmits the downstream signal for the ONU 20. The downstream signal may arrive at all of the ONUs 20 through the splitters. Accordingly, in the ONU group 20A, there is a need to prevent an LOS warning issued by the received light device damage or issued because the signals for other ONUs cannot be normally received, from being notified (misrecognized) to the OLT 10 at an unnecessary timing.

In order to prevent the above problem, as described above, the OLT 10 first notifies the ONUs of a timing at which the downstream signal (as illustrated in FIG. 17, a downstream optical signal (a header or a payload within a super frame (different according to the embodiments)) of the heard part of the downstream signal (super frame) where different light intensities are mixed together, which is configured by an integral multiple of 125 microseconds received by the respective ONU groups 20A to 20C subsequently) is to be received. In the conventional GPON, the ONU 20 does not need to be strongly aware of the received light intensity, and discriminates whether the reception is necessary, or not, after the header information of the downstream signal is extracted by only the Port-ID. In this embodiment, because there is a need to transmit the optical signal with the light intensities different for each of the ONU groups, prior to transmission of the downstream payload including real data or the entire downstream signal (super frame), information for preannouncing an intensity change of the optical signal is transmitted to the respective ONUs (or the ONU group). This information is inserted into the PLOAM field part of the 125 microsecond base frame transmitted from the OLT 10 as illustrated in FIGS. 15 and 20.

Hereinafter, a flow of processing will be described with reference to FIG. 22. After receiving the downstream frame, the OLT 10 terminates and analyzes the subject frame according to the processing described in FIGS. 3 and 4, and implements a series of frame processing for transmission to the PON interval 80 including capsuling in the GEM frame (S102). After completion of the downstream frame generation, the OLT 10 confirms the communication distance to the ONU 20 (or the distance group to which the subject ONU 20 belongs) which is a destination of the subject frame from the ranging/DBA information DB (1061 in FIG. 3), and determines the light intensity in transmitting the downstream frame (S103). The OLT 10 notifies the ONU 20 of the determined optical signal intensity before transmitting the subject downstream frame (S104). This notice uses the light intensity map illustrated in FIGS. 15 and 19.

In this notice frame, the light intensity map is inserted into the PLOAM field of the subject frame in the actual operation. In the payload part of the frame is put the downstream signal payload in which the downstream signal transmission schedule has been notified by the light intensity map before. This signal arrives at the respective ONU groups 20A to 20C in a state where the signal intensity attenuates through the concentrated optical fiber 70, the first splitter 30, and the second splitter 31 and the S/N ratio is deteriorated. The ONU group 20A and the ONU group 20C receive a notice frame S104 according to the signal reception timings notified and set in advance, and acquire the transmission schedule of the downstream signal to be received subsequently (S105-20A, S105-20C). The on/off processing (S22001, S22002, S22003, S22004) of the downstream optical signal block controlled by the intensity controller 2311 is conducted according to the above-mentioned advance notice prior to the data frame. Alternatively, there can be applied a method in which the ONU group 20C recognizes that no signal is transmitted to the subject ONU during a given period, and during this period, the intensity controller 2311 blocks the signal. In a period other than the given period, in reception of downstream signal addressed to the subject ONU, the PON controller 2000 manages the time and the light reception status so as to suppress the LOS warning issuance.

In FIG. 22, it is assumed that in the light intensity map, the subsequent downstream data frame is the downstream signal addressed to only the ONU group 20A, and notifies the ONU group 20A of the reception time of the downstream signal. The ONU 20 belonging to the ONU group 20A controls the intensity controller 2311 at the transmission timing of the frame in response to the downstream light intensity map notice, turns off the light block function of the optical signal controller (S106), and receives the optical signal (S108). Upon completion of the signal duration, the ONU 20 again turns on light block (light block state) for preventing the damage of the light receiving device. On the other hand, there is a possibility that the downstream signal S107 also arrives at the ONU group 20C (S109). The ONU group 20C recognizes that a signal is not transmitted to the subject ONU during a given period, and maintains a state in which the light block is turned on during that period (or LOS suppression control is conducted). In the case of FIG. 22, the ONU group 20C can recognize that there is no need to transmit the LOS alarm to the OLT 10 during that period, and continues a state in which the light block is on until the downstream signal addressed to the ONU group 20C is subsequently received (S109).

Figure 23:
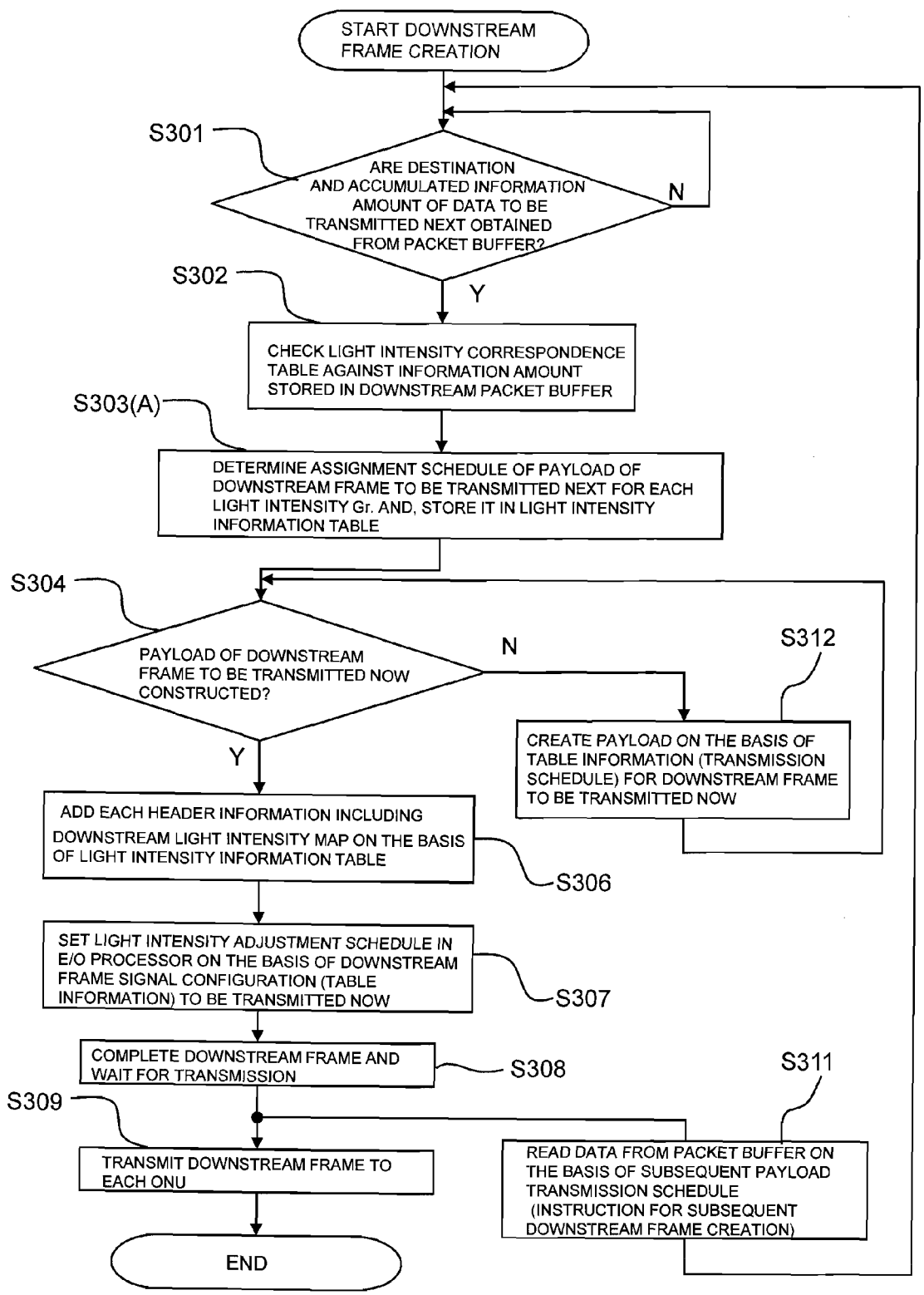
FIG. 23 is a flowchart illustrating a downstream frame creating procedure of a down frame processor.

Referring to FIG. 23, the processing of generating the downstream light intensity map will be described. Referring to FIG. 23, the downstream BW map generation unit 12107 determines whether the destination of data to be transmitted next and the amount of accumulated information are obtained from the packet buffer, or not (S301). If no, the downstream BW map generation unit 12107 again shifts to Step 301. If yes in Step 301, the downstream BW map generation unit 12107 checks a light intensity correspondence table against the amount of information (S302). The downstream BW map generation unit 12107 determines a payload assignment schedule of the downstream frame to be next transmitted, and stores the determined payload assignment schedule in the light intensity information table (S303). The downstream BW map generation unit 12107 determines whether the payload of the downstream frame to be transmitted now has been constructed, or not (S304). If yes, the GEM frame generation unit 12104 adds various header information including the downstream light intensity map based on the light intensity information table created in Step 303 to the downstream frame (S306). The downstream BW map transmission controller 12108 sets the light intensity adjustment schedule of the O/E processor 1310 on the basis of the downstream frame configuration generated in the downstream BW map generation unit 12107 (S307). The GEM frame generation unit 12104 holds the transmission wait frame (S308). In this situation, the GEM frame generation unit 12104 aligns the downstream frames according to the schedules determined in Step S30. The GEM frame generation unit 12104 transmits the downstream frames to the respective ONUs 20 through the O/E processor 1310 (S309), and ends the processing. In parallel to Step 309, the downstream BW map generation unit 12107 confirms the transmission schedule of the packet buffer 12101, the header analysis unit 12105, and the downstream BW map controller 12108, starts the subsequent downstream frame generation processing (S311), and shifts to Step 301. If no in Step 304, the GEM frame generation unit 12104 creates the frame payload for the downstream frame to be transmitted now (S312).

According to the above-described embodiments, in a case where the difference distance between the ONUs is increased due to an increase in the communication distance extension and the number of personal stations in the optical communication system (PON), in a case where the configuration in which the plural ONUs different in the optical communication interval length and the transmission bit rate from each other are accommodated in the same OLT, or in a configuration applied to both of those cases, the OLT notifies the ONUs of the timing at which the signal from the OLT is received in advance. As a result, communication can be conducted with the use of the ONU having the same performance for each bit rate regardless of communication distance between ONU and OLT. Even when the plural ONUs different in the bit rate (largely different in the optical signal transmission intensity) are accommodated at the same time, cross talk or the failure of the optical device can be avoided. As compared with the existing PON, because the format at the time of transmitting the downstream signal in the OLT of the cell station is merely slightly changed, the costs related to new provision or additional provision of the optical access network facility such as the system development costs or the introduction costs accompanied by an increase in the number of users are minimized.

According to the above embodiments, the downstream signal transmission schedule notified to the ONUs of in advance is transmitted in a given period. The transmission time zone occupied by the downstream signal transmission schedule is determined prior to the bandwidth assignment of the downstream signal. Therefore, at the time of generating the downstream frame in the OLT, the transmission place (insertion place within the frame) of the transmission schedule can be determined prior to general data, and the transmission processing in the fixed period is facilitated. Also, the transmission period of the transmission schedule is made variable according to the user contract or the use service characteristic whereby, in the narrow bandwidth communication, the period of the schedule is set to be longer so that the bandwidth occupied by the transmission schedule per se can be reduced, and in the broad bandwidth, the period of the schedule is set to be shorter so that the amount of buffer provided in the OLT and the ONUs can be reduced.

What is claimed is:

1. A communication system comprising:
a plurality of optical network units, and
an optical line terminal connected to the optical network units through optical fibers, wherein
the optical line terminal measures communication distances to the optical network units, holds measurement results, adjusts a light intensity of a downstream communication signal to each of the optical network units on the basis of the measurement results, and notifies the optical network units of a transmission schedule of the downstream communication signal prior to transmission of the downstream communication signal,
each of the optical network units receives only an optical signal of the subject optical network unit on the basis of the received transmission schedule, and discards or blocks optical signals addressed to other optical network units, and
the optical line terminal has a function of transmitting arrival timing information in a given period, in transmitting a signal having the arrival timing information, about the light intensity of the downstream communication signal addressed to the respective optical network units to the respective optical network units in advance, prior to processing of transmitting the downstream communication signal to the respective optical network units.

2. The communication system according to claim 1, wherein
the optical line terminal comprises a light intensity adjustment circuit for setting a transmission light intensity to adjust the light intensity of the downstream communication signal according to a connection distance to each of the optical network units, and
the light intensity adjustment circuit sets an optimum light intensity for transmitting an optical signal to each of the optical network units which is a destination, on the basis of the distance measurement results.

3. The communication system according to claim 1, wherein
each of the optical network units holds timing information to receive in the subject optical network unit, for receiving the downstream communication signal transmitted from the optical line terminal.

4. The communication system according to claim 1, wherein
the optical line terminal has a function of determining the light intensity of the downstream communication signal as it is assumed that, in accommodating the plurality of optical network units, a group of the optical network units whose connection distances to the optical line terminal fall within a given range is set as one group, and in the operation of the optical network units, one or a plurality of the optical network units groups are set as a unit.

5. The communication system according to claim 1, wherein
the optical line terminal comprises a unit that, with respect to the optical network units, sets or gives notice of an arrival time of the signal, as a relative or absolute time at which the light intensity information of the downstream communication signal is to be received, before the optical line terminal transmits the light intensity information of the downstream communication signal.

6. The communication system according to claim 5, wherein
the optical line terminal has a unit for determining one or a plurality of parameters among a communication distance between the optical network units and the optical line terminal, a signal bit rate used for the communication, a type of service provided to a subscriber by the communication, a subscriber request or contract related to the communication, the number of subscribers or services which can be accommodated in the optical line terminal, and a processing performance of the optical line terminal, in determining a given value as a transmission period of the transmission schedule for each of the optical network units, or the optical network unit group, in transmitting the transmission schedule of the downstream communication signal for transmitting the light intensity information of the downstream communication signal to the respective optical network units.

7. The communication system according to claim 1, wherein
the optical line terminal comprises a unit that sets a given value as a transmission period of the transmission schedule for each of the optical network units, or an optical network unit group, in transmitting the transmission schedule of the downstream communication signal for transmitting the light intensity information of the downstream communication signal to the respective optical network units.

8. A communication device connected to optical network units through optical fibers, comprising:
a function of measuring communication distances to the optical network units and holding measurement results; and a function of adjusting a light intensity of a downstream communication signal to the optical network units on the basis of the measurement results, and notifying the optical network units of a transmission schedule of the downstream communication signal in a given period prior to transmission of the downstream communication signal, and
a function of transmitting a signal having arrival timing information in a given period, about the light intensity of the downstream communication signal addressed to the respective optical network units, to the respective optical network units in advance, prior to processing of transmitting the downstream communication signal to the respective optical network units, and
a function of setting a given value as a transmission period of the transmission schedule for each of the optical network units or an optical network unit group.

9. The communication device according to claim 8, further comprising:
a light intensity adjustment circuit for setting a transmission light intensity to adjust the light intensity of the downstream communication signal according to a connection distance to each of the optical network units, and
an intensity control function, by using the light intensity adjustment circuit, sets an optimum light intensity for transmitting an optical signal to each of the optical network units which is a destination, on the basis of the distance measurement results.

10. The communication device according to claim 8, further comprising:
a function of determining the light intensity of the downstream communication signal as it is assumed that, in accommodating the plurality of optical network units, a group of the optical network units whose connection distances to the optical line terminal fall within a given range is set as one group, and in the operation of the optical network units, one or a plurality of the optical network units groups are set as a unit.

11. The communication device according to claim 8, further comprising: a unit for notifying the optical network units of an arrival time of the signal, as a relative or absolute time at which the light intensity information of the downstream communication signal is to be received, before transmitting the light intensity information of the downstream communication signal.

12. The communication device according to claim 8, further comprising:
a function of determining one or a plurality of parameters among a communication distance between the optical network units and the optical line terminal, a signal bit rate used for the communication, a type of service provided to a subscriber by the communication, a subscriber request or contract related to the communication, the number of subscribers or services which can be accommodated in the optical line terminal, and a processing performance of the optical line terminal, in determining a given value as a transmission period of the transmission schedule for each of the optical network units, or the optical network unit group, in transmitting the transmission schedule of the downstream communication signal for transmitting the light intensity information of the downstream communication signal to the respective optical network units.

13. An optical network unit connected to an optical line terminal through an optical fiber, comprising:
- a reception timing determination unit that acquires, upon receiving an optical signal transmitted from the optical line terminal, from the received signal, timing information on which an optical signal addressed to the subject optical network unit, or an optical signal having a light intensity that can be received by the subject optical network unit arrives at the subject optical network unit, with reference to the received signal;
- a block mechanism that blocks the optical signal when the optical signal transmitted from the optical line terminal exceeds a light intensity receivable by the optical network unit;
- a discard function that discards the optical signal when the optical signal transmitted from the optical line terminal falls below a light intensity receivable by the optical network unit; and
- a function of acquiring the optical signal of the light intensity that can be received by the subject optical network unit, or an arrival timing of the optical signal addressed to the subject optical network unit in a given period, prior to reception of the optical signal.

* * * * *